US012676892B2

(12) United States Patent
Valek et al.

(10) Patent No.: US 12,676,892 B2
(45) Date of Patent: Jul. 7, 2026

(54) SECURITY POLICY FRAMEWORK FOR CLOUD ENVIRONMENTS

(71) Applicant: Zscaler, Inc., San Jose, CA (US)

(72) Inventors: Robert Valek, Madrid (ES); Tomer Heber, Austin, TX (US); Arik Kfir, Kefar Sava (IL)

(73) Assignee: Zscaler, Inc., San Jose, CA (US)

( * ) Notice: Subject to any disclaimer, the term of this patent is extended or adjusted under 35 U.S.C. 154(b) by 220 days.

(21) Appl. No.: 18/493,351

(22) Filed: Oct. 24, 2023

(65) Prior Publication Data

US 2025/0133120 A1      Apr. 24, 2025

(51) Int. Cl.
 *H04L 9/40* (2022.01)
 *G06F 16/9538* (2019.01)
(52) U.S. Cl.
 CPC .......... *H04L 63/20* (2013.01); *G06F 16/9538* (2019.01)
(58) Field of Classification Search
 CPC .. H04L 63/1433; H04L 63/20; G06F 16/9538
 See application file for complete search history.

(56) References Cited

U.S. PATENT DOCUMENTS 7,664,795 B2 *   2/2010  Balin .................... G06F 16/214
                                                        717/172
9,183,272 B1 *  11/2015  Jonsson ................ G06F 16/283

11,785,051 B1 *  10/2023  Rossman ............ H04L 63/1433
                                                        726/1
2010/0250726 A1    9/2010  Moses et al.
2022/0239673 A1    7/2022  Kfir et al.
2022/0400128 A1   12/2022  Kfir et al.
2023/0039860 A1 *   2/2023  Chipman .......... G06F 16/24553

OTHER PUBLICATIONS

Bauer, Lujo, Jay Ligatti, and David Walker. "Composing expressive runtime security policies." ACM Transactions on Software Engineering and Methodology (TOSEM) 18.3: 1-43. (Year: 2009).*
Mehta, Aastha, et al. "Qapla: Policy compliance for database-backed systems." 26th USENIX Security Symposium (USENIX Security 17). (Year: 2017).*
Scott, David, and Richard Sharp. "Specifying and enforcing application-level web security policies." IEEE Transactions on Knowledge and data Engineering 15.4: 771-783. (Year: 2003).*
Srivastava, Varun, et al. "A security policy oracle: Detecting security holes using multiple API implementations." ACM SIGPLAN Notices 46.6: 343-354. (Year: 2011).*

* cited by examiner

*Primary Examiner* — John M MacIlwinen
(74) *Attorney, Agent, or Firm* — Baratta Law PLLC; Lawrence A. Baratta, Jr.; Ryan Odessa

(57) ABSTRACT

The present disclosure includes systems and methods for a security policy framework. Various embodiments include responsive to receiving a trigger, fetching one or more policies from a policy catalog service; compiling the one or more policies into a query, wherein the one or more policies can be compiled into a plurality of different query languages; executing the query over customer data, the customer data being located in one or more data sources; and persisting results of the query.

16 Claims, 31 Drawing Sheets

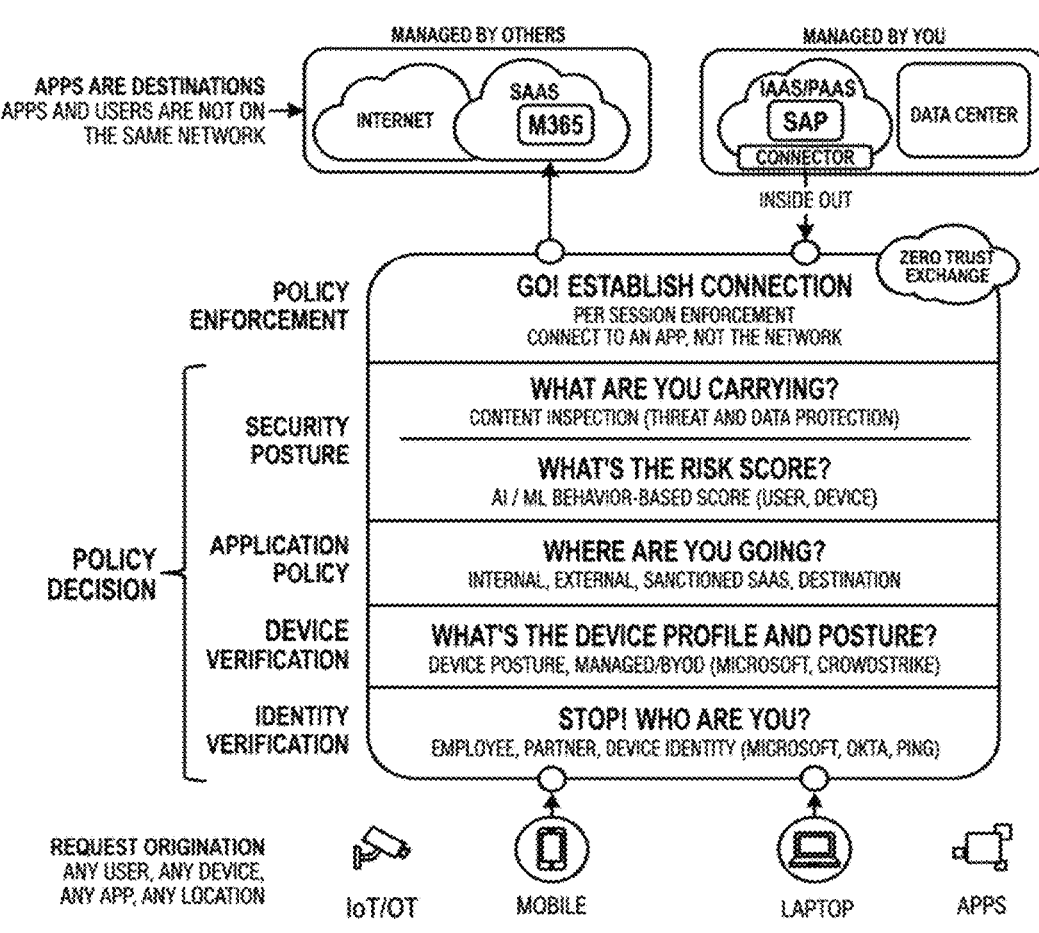

COMPARING ZERO TRUST WITH A NETWORK FIREWALL ARCHITECTURE

|  | ZERO TRUST | FIREWALLS/VPN |
|---|---|---|
| ELIMINATE ATTACK SURFACE<br>• No inbound connections<br>• Apps are invisable from the Internet | ✓ | ✗ |
| PREVENT LATERAL MOVEMENT<br>• User is not on the network, the network is simply transport | ✓ | ✗ |
| PREVENT COMPROMISE<br>• Inspect content to block threats<br>• TLS  at scale | ✓ | ◯ LIMITED |
| PREVENT DATA LOSS<br>• Inline inspection to prevent data loss | ✓ | ◯ LIMITED |

2402
Retrieving network flow logs associated with one or more Virtual Private Cloud (VPC) networks 2404
Processing the network flow logs to identify new files and enriching critical fields from the network flow logs 2406
Aggregating the network flow logs for further processing 2408
Identifying threats associated with the one or more VPC networks CRUD APIs ON POLICIES

POLICY CATALOG SERVICE

2600

POLICY STORAGE

SECURITY POLICY FRAMEWORK FOR CLOUD ENVIRONMENTS

FIELD OF THE DISCLOSURE

The present disclosure relates generally to networking and computing. More particularly, the present disclosure relates to systems and methods for a security policy framework for cloud environments.

BACKGROUND OF THE DISCLOSURE

Today's development teams work across many Infrastructure as a Service (IaaS), Platform as a Service (PaaS), and Software as a Service (SaaS) offerings. Additionally, developers have shifted from developing monolithic web applications to leveraging microservices and serverless architectures. Securing cloud-native applications requires continuous automated risk assessment and security which needs to be tightly integrated into infrastructure as well as the applications themselves. Further, traditional solutions require policies to be represented directly as application code in a specific programing language or a combination thereof. This results in multiple limitations and challenges. The present disclosure provides a generic solution to express security policies, which allows automated evaluation of these policies over customer data.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include responsive to receiving a trigger, fetching one or more policies from a policy catalog service; compiling the one or more policies into a query; executing the query over customer data, the customer data being located in one or more data sources; and persisting results of the query.

The steps can further include displaying the results to the customer via a Graphical User Interface (GUI). The results can include one or more alerts associated with the customer's cloud environment. The trigger can be received based on any of a schedule or receiving some data about a customer's infrastructure. The query can be executed over customer data located in a plurality of data sources. The one or more policies can be compiled into a plurality of different query languages. The one or more policies can be associated with posture control of the customer's cloud environment, wherein the customer data includes posture control data. The posture control data can include any of assets, identities, network flow logs, activities, and code repositories in the customer's cloud environment. The results can include alerts associated with a combination of a misconfiguration and an activity as a risk in the customer's cloud environment. The cloud environment can be any of a run-time cloud environment and a build-time cloud environment.

BRIEF DESCRIPTION OF THE DRAWINGS

The present disclosure is illustrated and described herein with reference to the various drawings, in which like reference numbers are used to denote like system components/method steps, as appropriate, and in which:

FIG. 1C is a logical diagram illustrating zero trust policies with the cloud-based system and a comparison with the conventional firewall-based approach.

FIG. 4 is a block diagram of a user device, which may be used with the cloud-based system or the like.

DETAILED DESCRIPTION OF THE DISCLOSURE

The traditional view of an enterprise network (i.e., corporate, private, industrial, operational, etc.) included a well-defined perimeter defended by various appliances (e.g., firewalls, intrusion prevention, advanced threat detection, etc.). In this traditional view, mobile users utilize a Virtual Private Network (VPN), etc. and have their traffic back-hauled into the well-defined perimeter. This worked when mobile users represented a small fraction of the users, i.e., most users were within the well-defined perimeter. However, this is no longer the case—the definition of the workplace is no longer confined to within the well-defined perimeter, and with applications moving to the cloud, the perimeter has extended to the Internet. This results in an increased risk for the enterprise data residing on unsecured and unmanaged devices as well as the security risks in access to the Internet. Cloud-based security solutions have emerged, such as Zscaler Internet Access (ZIA), Zscaler Private Access (ZPA), and Zscaler Posture Control (ZPC) available from Zscaler, Inc., the applicant and assignee of the present application.

Example Cloud-Based System Architecture

Figure 1A:
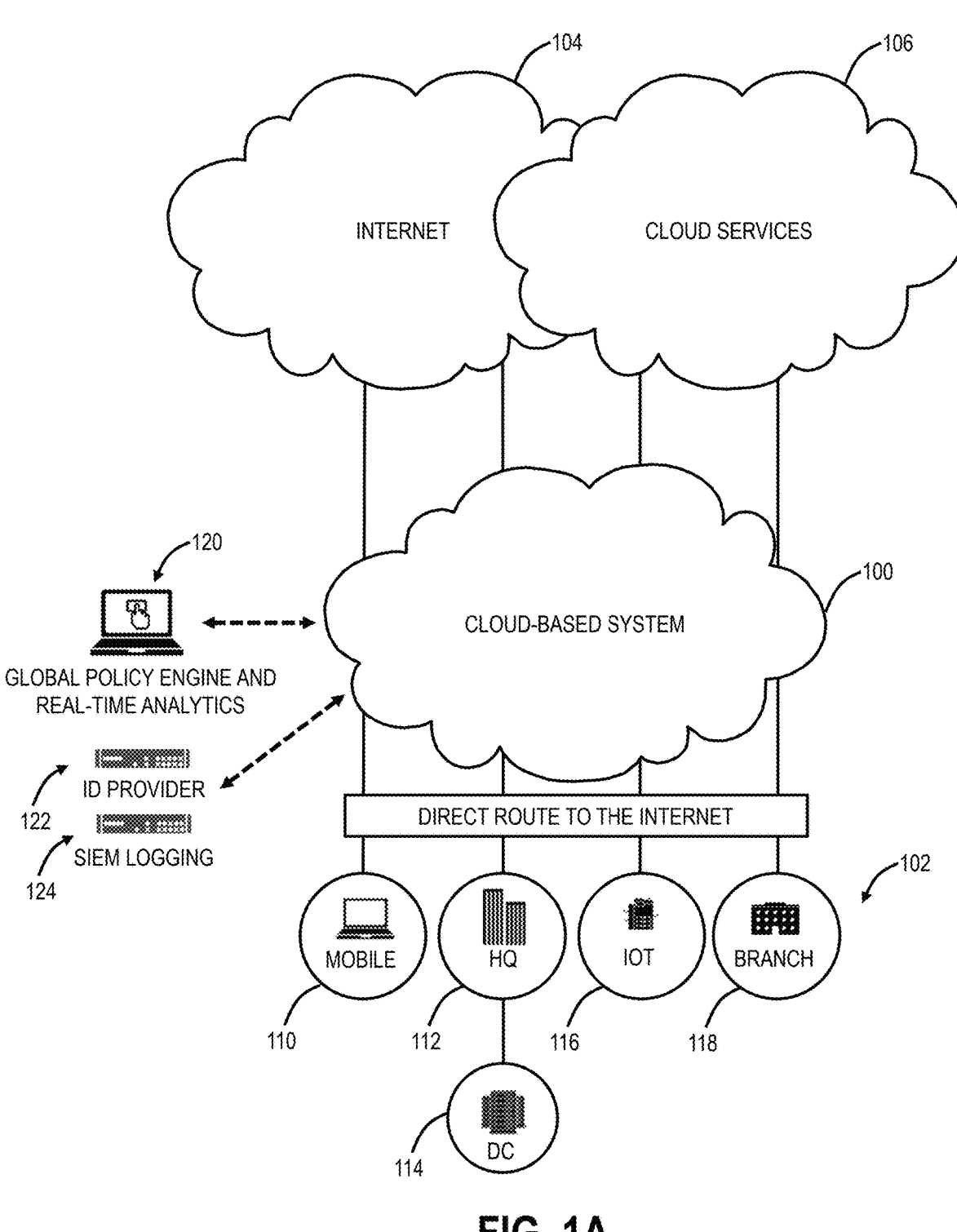
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
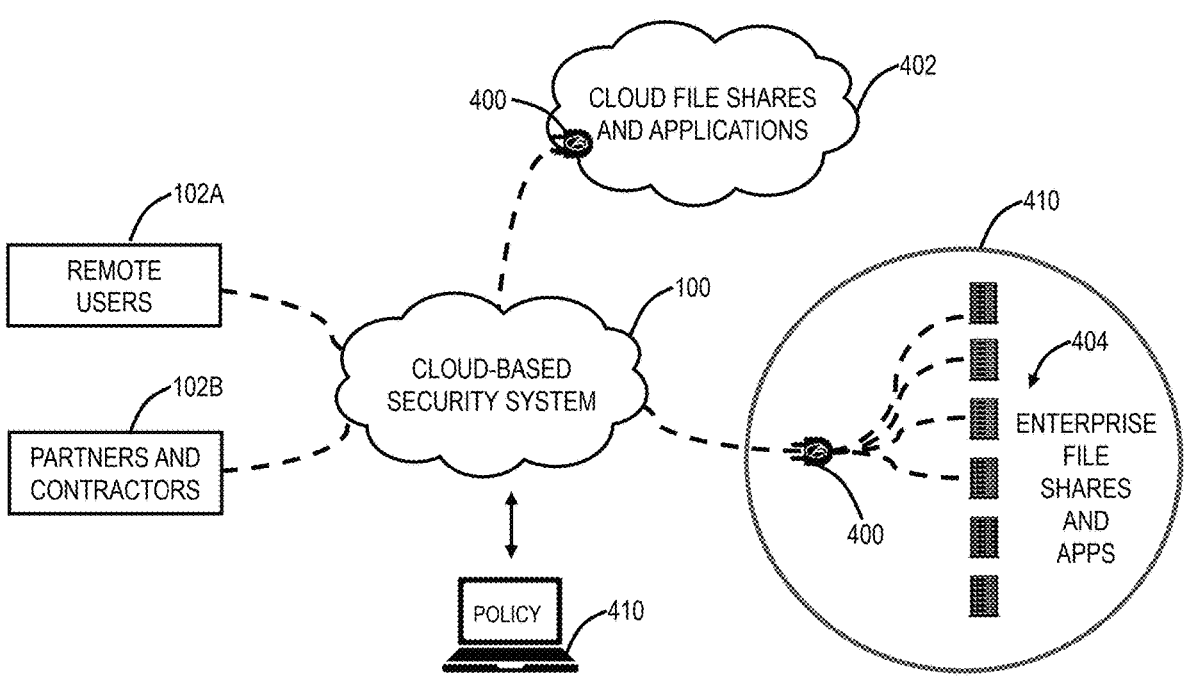
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
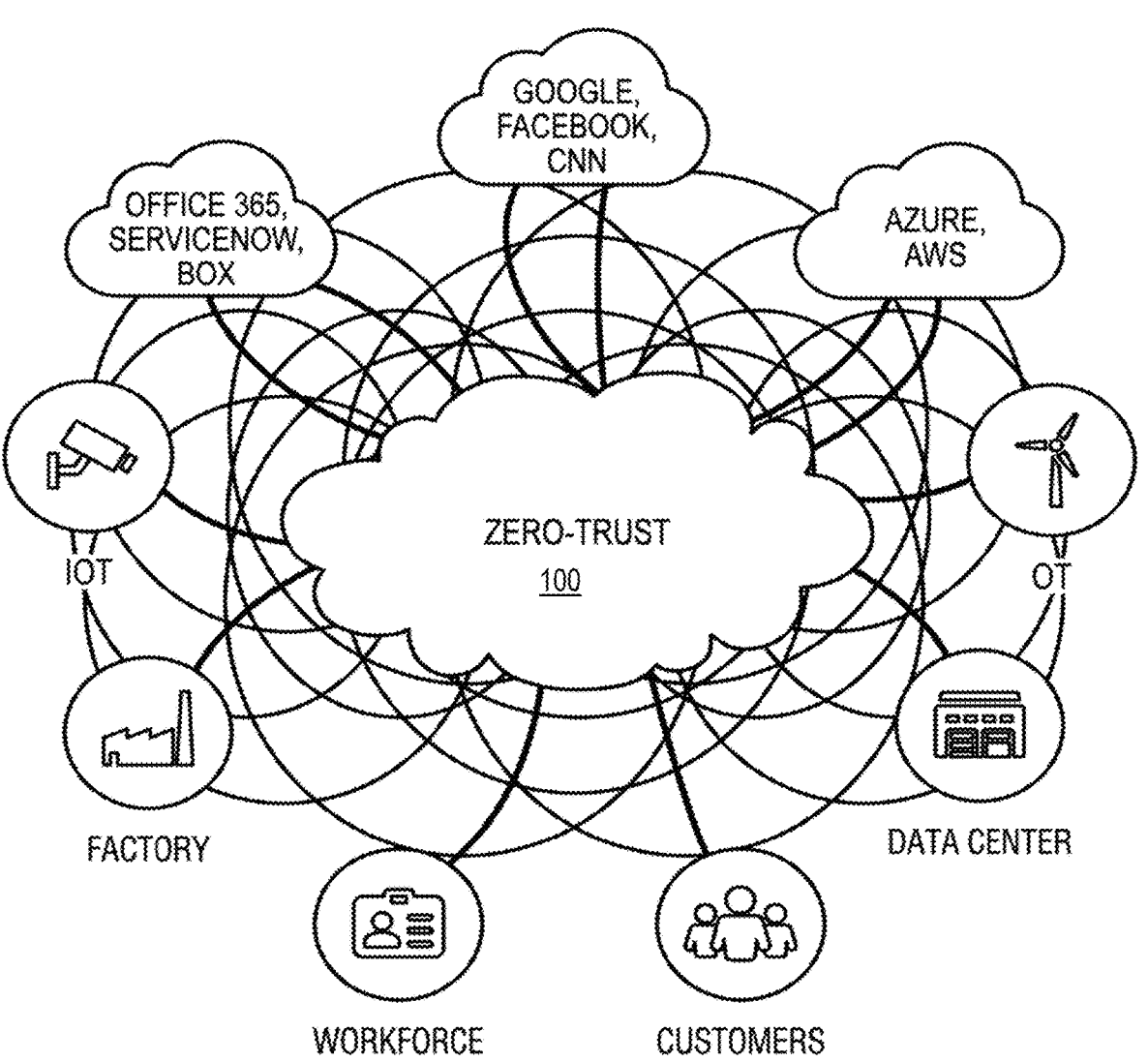
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication—not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based
System

Figure 2:
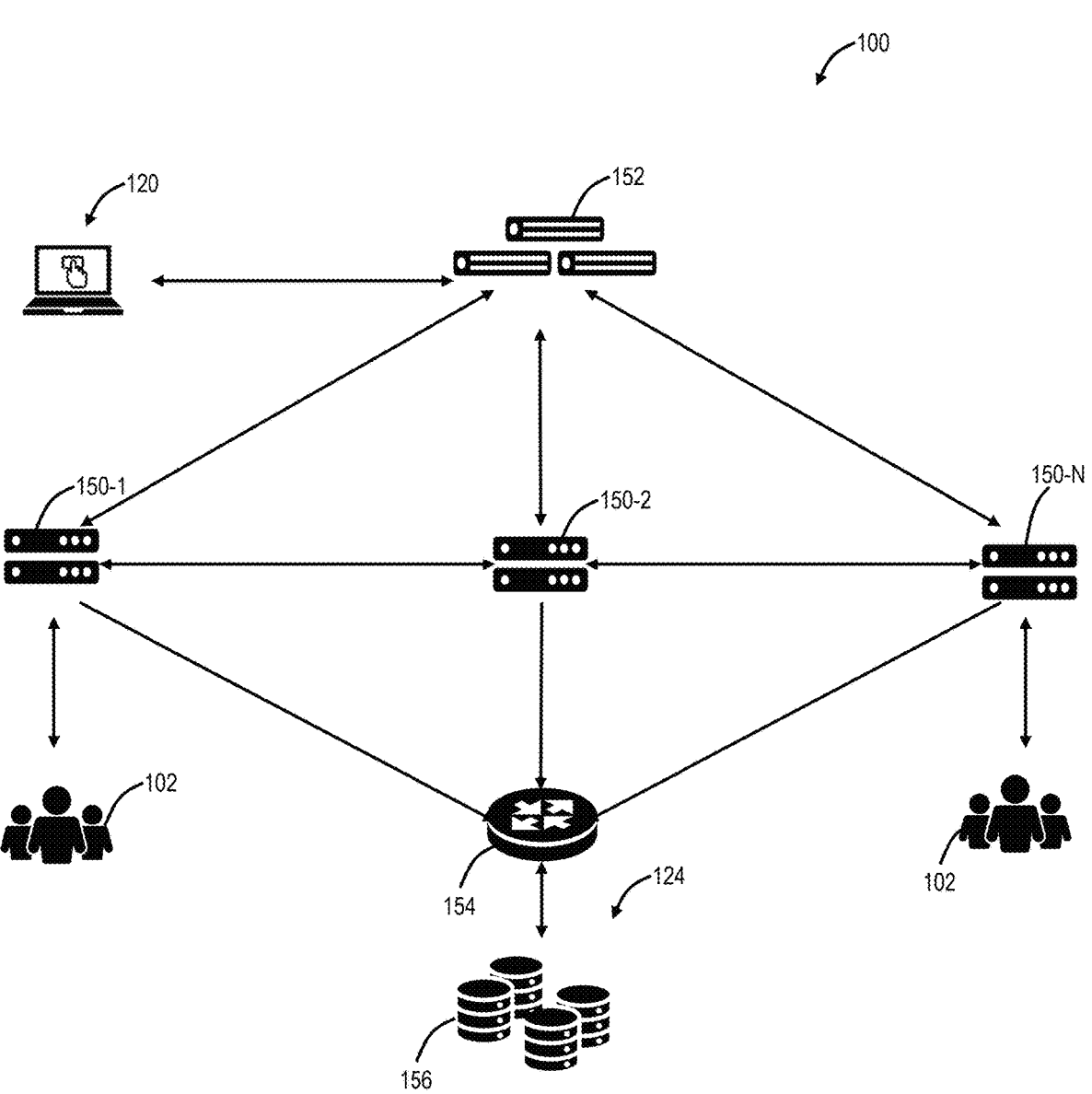
FIG. 2 is a network diagram of an example implementation of the cloud-based system.
Figure 4:
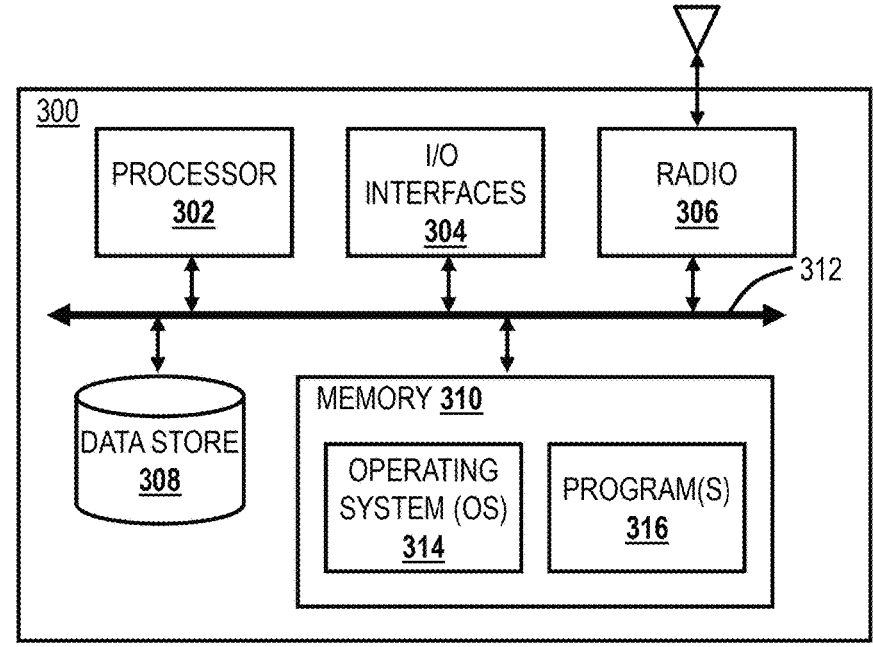

FIG. 2 is a network diagram of an example implementation of the cloud-based system 100. In an embodiment, the cloud-based system 100 includes a plurality of nodes 150, labeled as nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the nodes 150. The central authority 152 provide centralized policy, real-time threat updates, etc. and coordinates the distribution of this data between the nodes 150. The nodes 150 provide an onramp to the users 102 and are configured to execute policy, based on the central authority 152, for each user 102. The nodes 150 can be geographically distributed, and the policy for each user 102 follows that user 102 as he or she connects to the nearest (or other criteria) node 150.

Of note, the cloud-based system 100 is an external system meaning it is separate from tenant's private networks (enterprise networks) as well as from networks associated with the devices 110, 116, and locations 112, 118. Also, of note, the present disclosure describes a private node 150P that is both part of the cloud-based system 100 and part of a private network. Further, the term nodes as used herein with respect to the cloud-based system 100 can be one or more servers, including physical servers, virtual machines (VM) executed on physical hardware, appliances, custom hardware, compute resources, clusters, etc., as described above, i.e., the nodes 150 contemplate any physical implementation of computer resources. In some embodiments, the nodes 150 can be Secure Web Gateways (SWGs), proxies, Secure Access Service Edge (SASE), etc.

The nodes 150 are full-featured secure internet gateways that provide integrated internet security. They inspect all web traffic bi-directionally for malware and enforce security, compliance, and firewall policies, as described herein, as well as various additional functionality. In an embodiment, each node 150 has two main modules for inspecting traffic and applying policies: a web module and a firewall module. The nodes 150 are deployed around the world and can handle hundreds of thousands of concurrent users with millions of concurrent sessions. Because of this, regardless of where the users 102 are, they can access the Internet 104 from any device, and the nodes 150 protect the traffic and apply corporate policies. The nodes 150 can implement various inspection engines therein, and optionally, send sandboxing to another system. The nodes 150 include significant fault tolerance capabilities, such as deployment in active-active mode to ensure availability and redundancy as well as continuous monitoring.

In an embodiment, customer traffic is not passed to any other component within the cloud-based system 100, and the nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the nodes 150. In another embodiment, specific data specified by each tenant, e.g., only email, only executable files, etc., is processed through one of the nodes 150.

Each of the nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, nonviolating, neutral, unknown. Based on the subset classification, the node 150 may allow the distribution of the content item, preclude distribution of the content item, allow distribution of the content item after a cleaning process, or perform threat detection on the content item. In an embodiment, the actions taken by one of the nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The nodes 150 establish persistent connections to the central authority 152 to download all policy configurations. When a new user connects to a node 150, a policy request is sent to the central authority 152 through this connection. The central authority 152 then calculates the policies that apply to that user 102 and sends the policy to the node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the nodes 150 request the new policy when the user 102 next makes a request. In an embodiment, the node 150 exchange "heartbeats" periodically, so all nodes 150 are informed when there is a policy change. Any node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
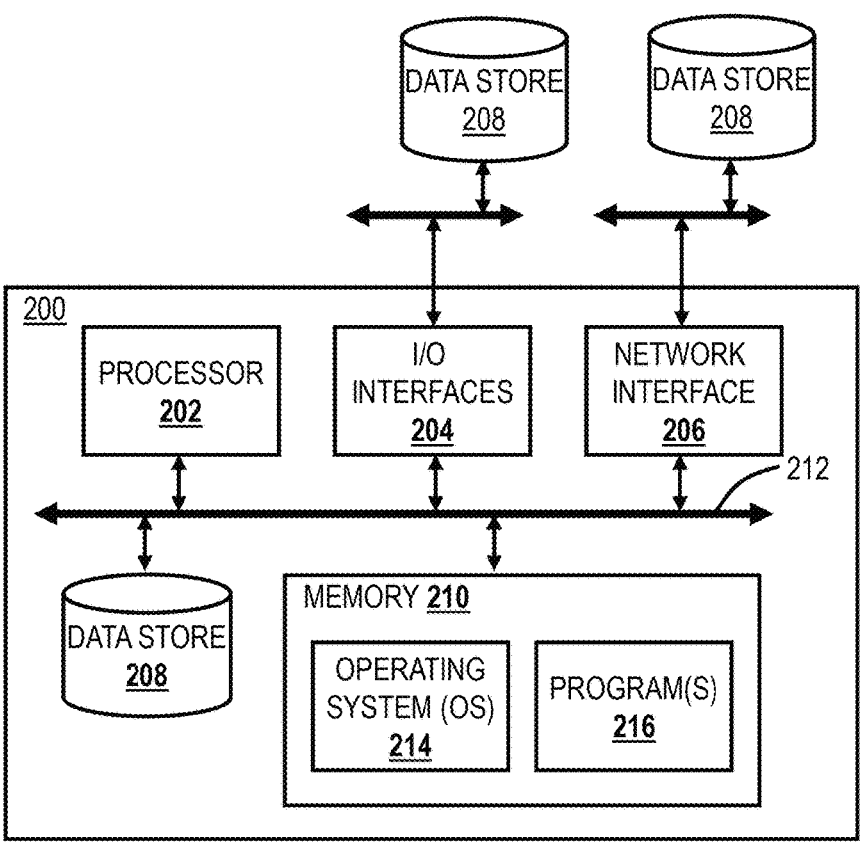
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications.

Advantageously, there is no hardware to buy or deploy because the virtual private access is a service offering to end-users and enterprises.

13

§ 6.0 Digital Experience Monitoring

Figure 6:
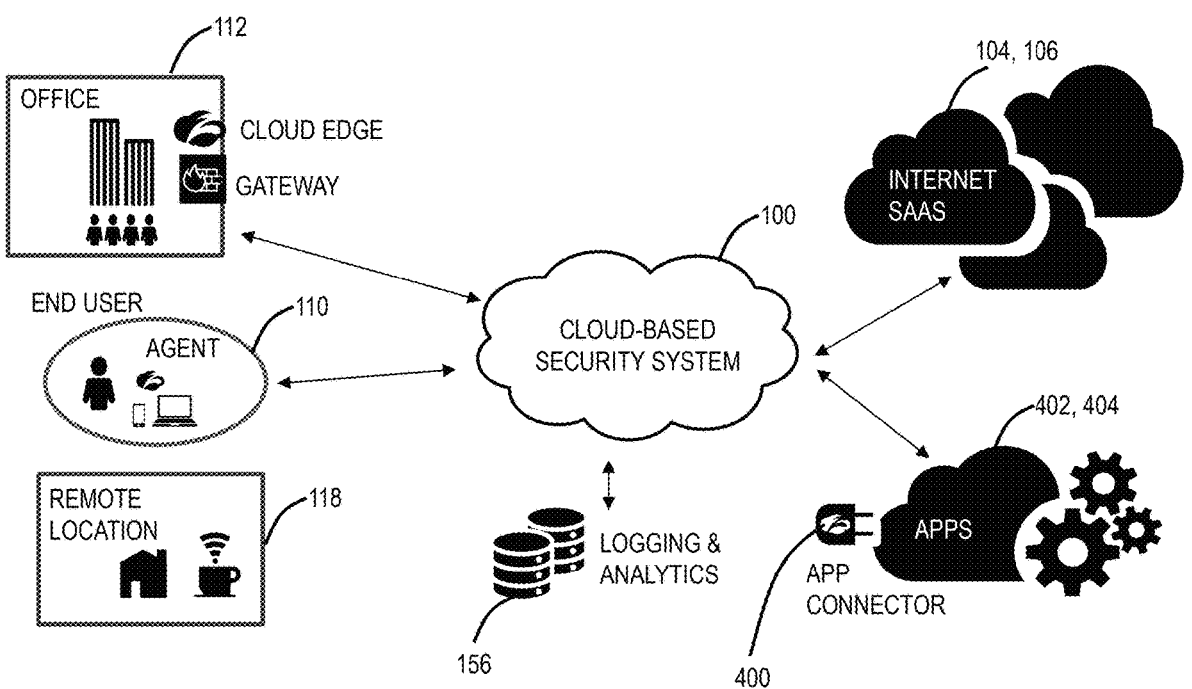
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Posture Control

The present disclosure provides systems and methods for posture control, also referred to as a Cloud-Native Application Protection Platform (CNAPP). Various embodiments provide cloud-native application security as an agentless solution that utilizes machine learning to correlate hidden risks caused by misconfigurations, threats, and vulnerabilities across the cloud-based system. Thus, security and development teams can prioritize and remediate risk associated with cloud-native applications as early as possible. Present solutions provide a comprehensive cloud security solution for all applications running on any service in the cloud-based system.

Cloud transformation introduces risks and security challenges to customers' security postures. Developers and infrastructure teams utilizing agile application development and deployment often overlook traditional security checks. Associated risks are further amplified by the fact that there can be hundreds of cloud services across a plurality of clouds, and no cloud service provider has the same capabilities. This makes it extremely difficult to maintain consistent zero trust security controls across the various clouds and workloads running in the multiple clouds.

Another issue faced by cloud security is the fact that most customers suffer from limited, or a lack of, visibility into what is running in the cloud. This includes limited visibility into where critical data is stored, what identities can access the critical data, and if any vulnerabilities exist in their code, applications, or cloud configurations. Various solutions to such problems have included bombarding operations teams with alerts, making it difficult and time-consuming to fine and resolve important issues.

Present systems and methods discover all assets for misconfiguration, vulnerabilities, and noncompliance. The use of machine learning and advanced threat correlation allows prioritization of high-impact risks. Embodiments further optimize responses with rich context, actionable information, automated guardrails, and step-by-step guided remediation. In order to comply with internal and external policies, various methods utilize preconfigured security policies and compliance libraries. Additionally, present systems can integrate with various ecosystems to enhance cross-collaboration and communication of threat remediation. A unified posture control platform can consolidate security stacks by replacing multipoint solutions with the present systems and methods.

Comprehensive coverage eliminates overhead and risk associated with disconnected point solutions by utilizing the present unified CNAPP. The unified CNAPP converges Cloud Security Posture Management (CSPM), Cloud Infrastructure Entitlement Management (CIEM), Configuration Management Database (CMDB), and Cloud Workload Protection Platform (CWPP) alongside Infrastructure as Code (IaC) security, vulnerability management, and compliance management.

Figure 7:
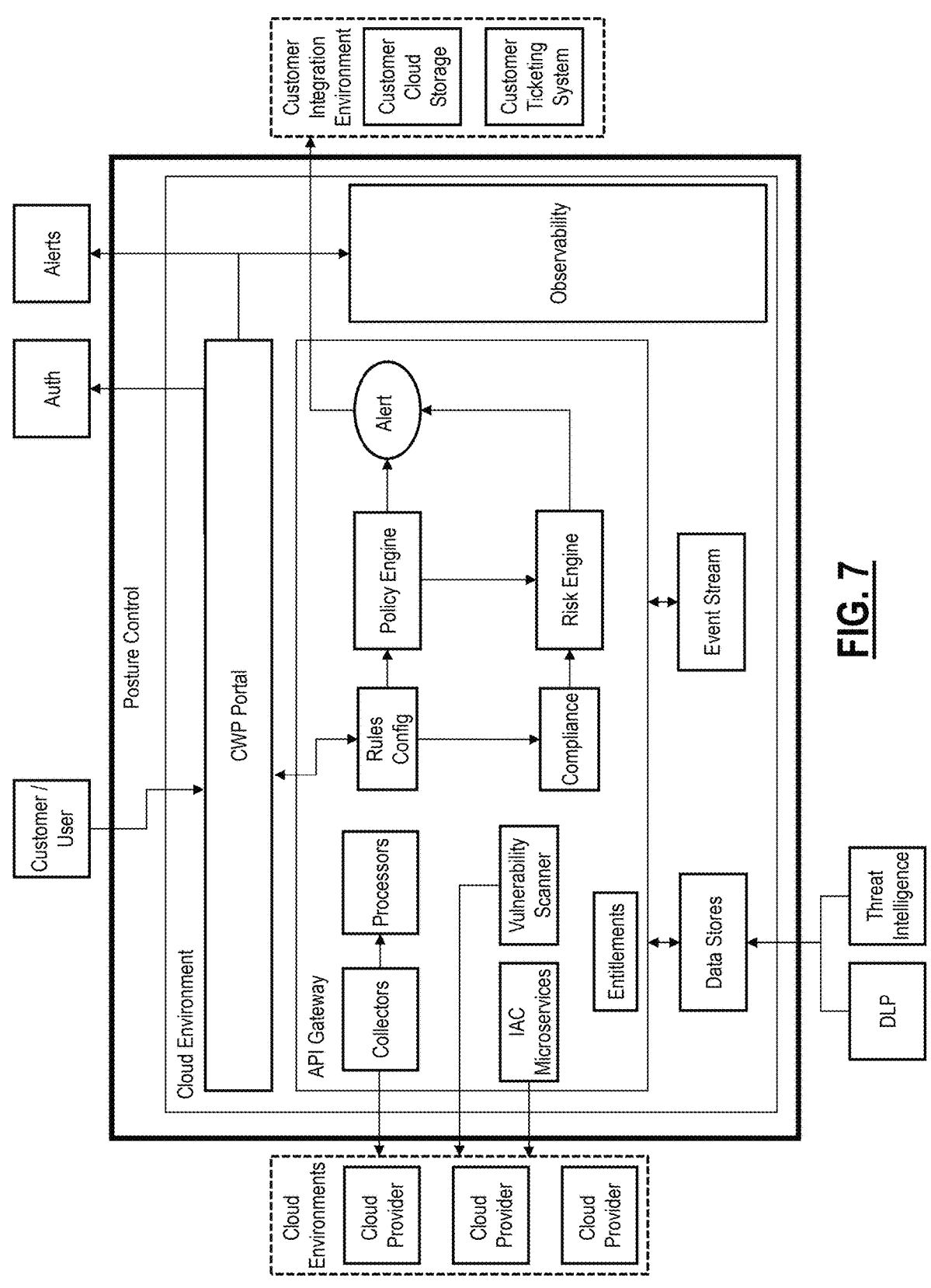
FIG. 7 is a diagram of a posture control architecture.

FIG. 7 is a diagram of a posture control architecture. Various embodiments of the posture control architecture are described herein with reference to various components depicted in FIG. 7. It will be appreciated that the examples disclosed herein are non-limiting examples, and other embodiments including other components known to one of skill in the art are also contemplated.

Various embodiments are adapted to uncover combinations of misconfigurations or activities that are seemingly low-risk in isolation, but together can create a real risk. Systems can additionally automatically prioritize correlated risks to improve Security Operations Center (SOC) efficiency and reduce alert fatigue. In order to identify and prioritize risk, embodiments of CNAPP are adapted to scan container images in registries and VMs in production environments.

Various embodiments include integration of CNAPP into development platforms (for example, VS Code), development operations tools (for example, GitHub and Jenkins), and security ecosystems (for example, ServiceNow, JIRA, and Splunk) to provide visibility, alerting, and control from early stages of builds to run stages. Similarly, embodiments of CNAPP are adapted to monitor automated deployment processes and send alerts when they identify critical security issues.

Embodiments of CNAPP can integrate with various cloud environments from a plurality of cloud providers (i.e., Amazon Web Services (AWS), Microsoft Azure, Google Cloud, etc.) and development operations tools to provide the various features of the present disclosure.

Figure 8:
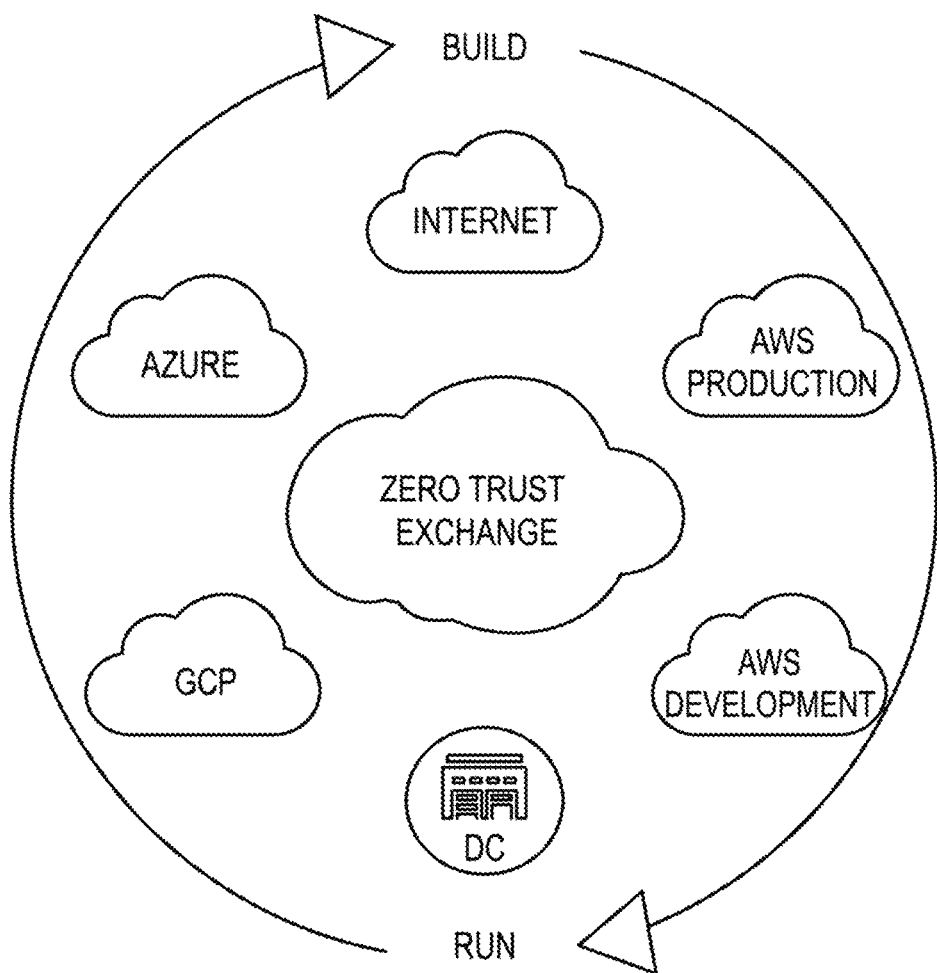
FIG. 8 is a network diagram of a zero trust architecture for providing an integrated security platform.

Again, the present disclosure provides systems and methods for posture control (CNAPP) to provide an integrated security platform from build to run. Various cloud security challenges include rapidly expanding workloads across a plurality of cloud platforms. Multiple point products and poor integrations can lead to data loss (i.e., CSPM, CIEM, IaC Scanning, DLP, etc.). Also, providing too many alerts and no context can make it difficult to identify true risk. FIG. 8 is a network diagram of a zero trust architecture for providing an integrated security platform. Posture control can provide exposure scanning to identify exposed assets and vulnerabilities (attack surfaces) and discover sensitive data. Configuration scanning allows posture control to identify and prioritize misconfigurations and identify excessive permissions for users and workloads. For example, identifying a user or workload having excessive permissions when the user or workload is deemed to be suspicious or risky. The present zero trust architecture securely connects users to applications, applications to applications, and machines to machines over any network in any location.

Discovery

Various embodiments of the posture control process include discovering raw information (posture control data) across multi-cloud and public cloud environments to produce correlative cloud security analytics. Such discovering can be a result of the scanning disclosed herein. For the discovery stage to operate, various embodiments allow onboarding and configuring of modules for automated discovery of all assets, identities, network flow logs, and activities in a particular public cloud environment. For IaC discovery, embodiments of posture control allow its customers to onboard code repositories and CI/CD tools hosted as SaaS services or self-hosted on on-premise environments. The discovery of data (i.e., assets, identities, network flow logs, activities, code repositories, CI/CD tools, configurations, etc.) can alternatively be referred to as scanning for or discovering posture control data. IaC code repositories and CI/CD environments are also referred to as build-time environments, whereas public cloud environments are referred to as run-time cloud environments. The various configurations of automated discovery can additionally be referred to as discovery modules.

Various embodiments allow configurable parameters for all discovery modules to collect changes at preconfigured intervals. Various configurable discovery module parameters include minimum time-frequency to collect ongoing changes, maximum time-frequency to collect ongoing changes, and stop collection of data in any discovery module at a preconfigured date and time. The various discovery modules enable a plurality of ways to collect (scan for) data from customers' environments and allow various modes of collection. In some embodiments, the modes of collection include APIs exposed to public cloud vendors and SaaS service providers for code repositories and CI/CD tools. Additionally, file transfers via HTTPS from public cloud storages and data lakes are also contemplated. In various embodiments, collection/scanning of data includes fully agentless scanning.

Figure 9:
FIG. 9 is a screenshot of a Graphical User Interface (GUI) displaying an asset and identity timeline.

FIG. 9 is a screenshot of a Graphical User Interface (GUI) that can be utilized to configure policies. The various configurable parameters can be customized for specific identities, groups of identities, types of identities, identities with specific entitlements, etc. The various policies can further be a part of the discovery modules.

Findings

Figure 10:
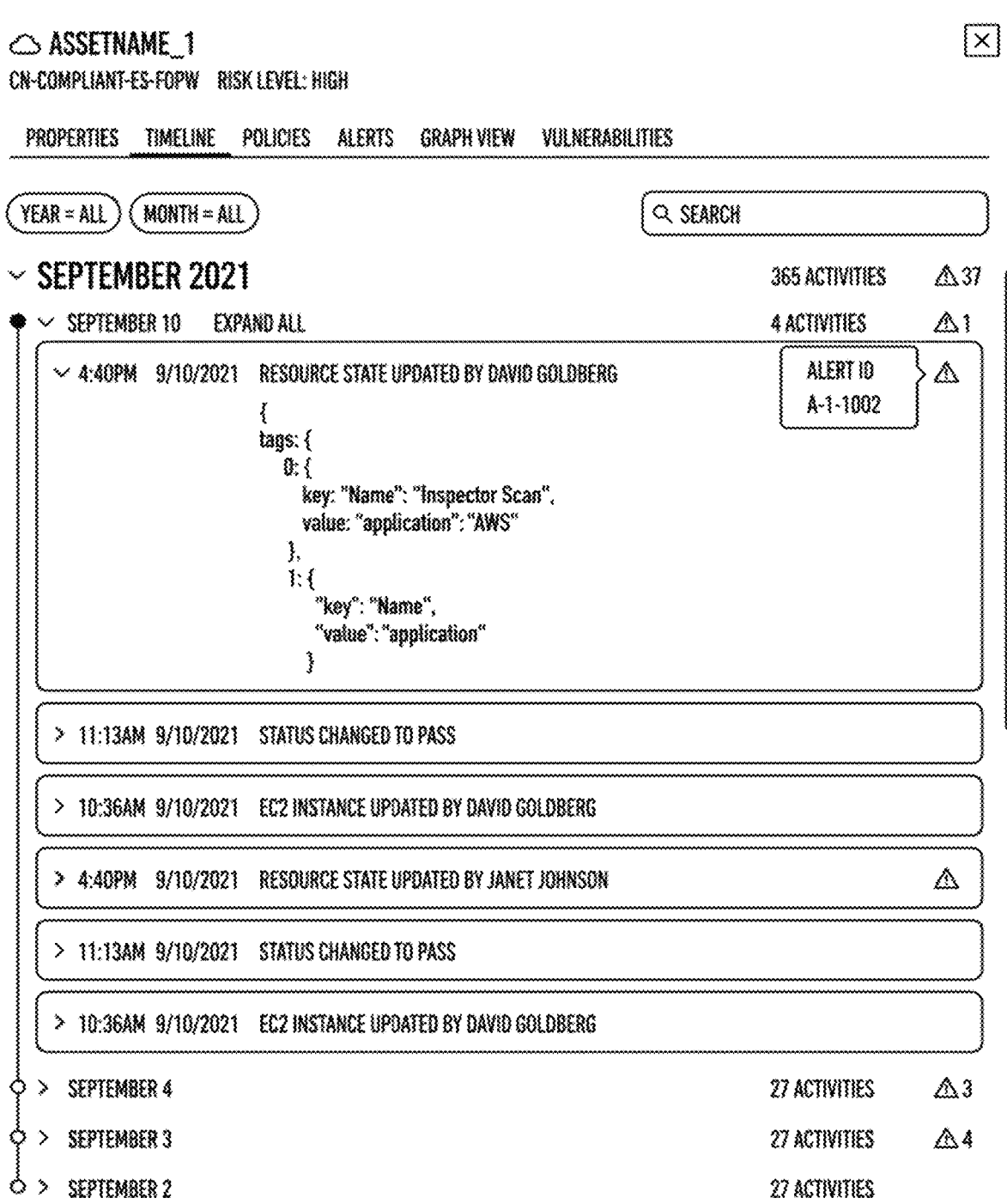
FIG. 10 is a screenshot of a GUI displaying an IaC scan.

In various embodiments, multi-cloud Configuration Management Databases (CMDBs) provide current and historical configurations of all things uniquely identifiable in the public cloud (run-time cloud) environments. Historical configurations can be identified up to a preconfigured historical date (i.e., 180 days prior), while current configurations are updated in real-time. Further, various features include identifying activities performed by identities across all public cloud environments. This similarly provides a historical view of activities performed by human or non-human identities present in Identity and Access Management (IAM) catalogs of native public cloud environments. FIG. 10 is a screenshot of a GUI displaying an asset and identity timeline. The example of FIG. 10 shows a timeline of activities associated with an identity. Such visualizations can provide the ability to search assets based on tags, regions, etc. They also provide the ability to view and download metadata, understand who changed what and when, and perform investigations by correlating events with alerts. Such investigations help to understand associated assets with their relationship, understand who has access to what and how, and visualize such relationships, alerts, and vulnerabilities in graphical representation.

Additionally, cloud infrastructure entitlement management provides a relationship between human and non-human identities including their authorization permissions to perform various actions in public cloud environments. The various data ingested from discovery modules can be aggregated to analyze transport layer communication in public clouds. Security policy findings modules can detect invalid configurations in run-time or build-time environments based on user preferences and rules enabled from pre-configurations in posture control systems.

In run-time environments, posture management can identify misconfiguration issues to provide compliance risks in the cloud. It can also be enabled to provide continuous monitoring and real-time security postures of individual compliance benchmarks based on data collected at set time intervals from the various discovery modules.

Figure 11:
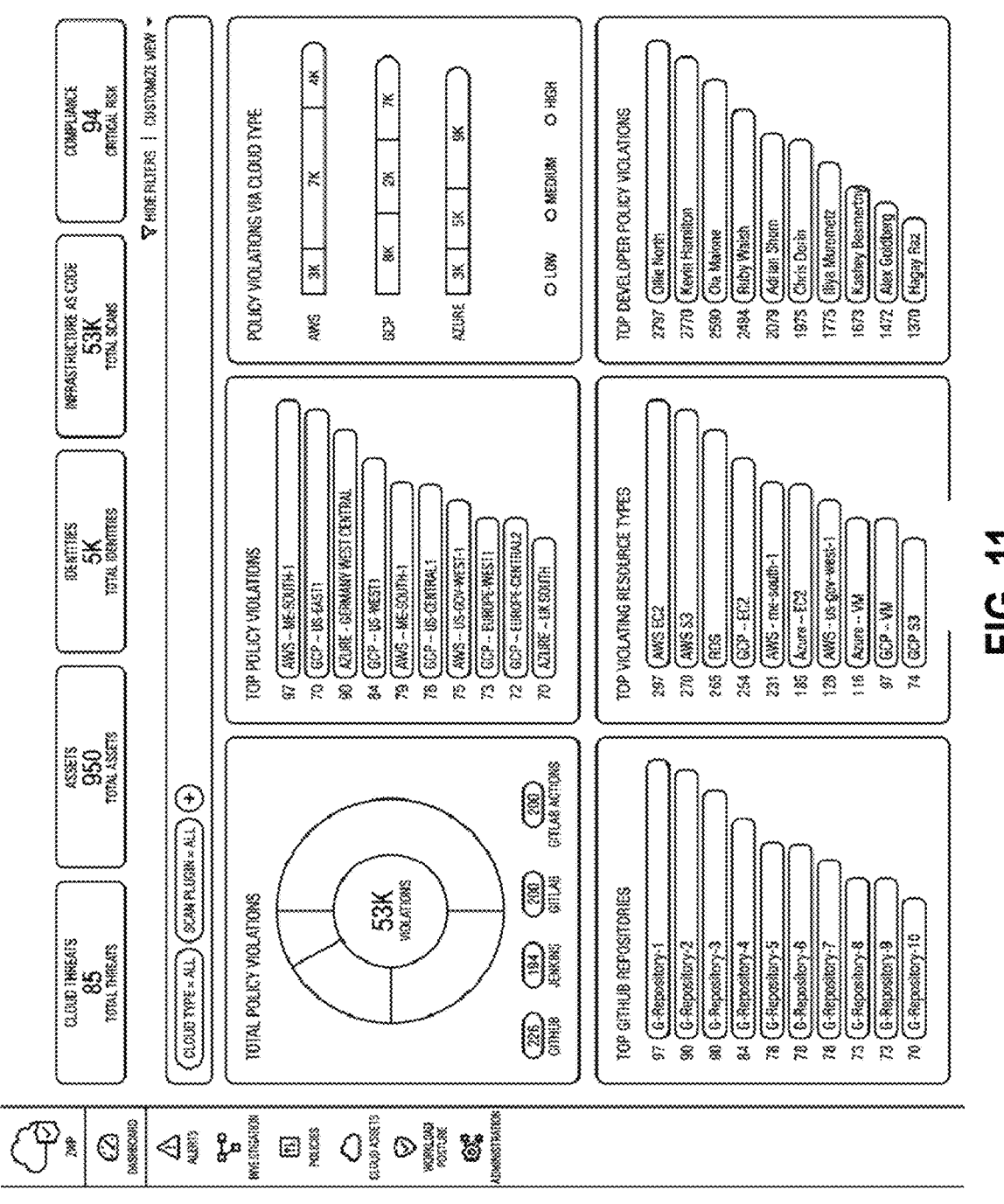
FIG. 11 is a screenshot of a GUI displaying a graphical visualization correlating relationships in a cloud environment.

Cloud security posture management identifies misconfiguration issues in build-time environments to provide compliance risks before asset/changes are deployed to the cloud environment via scripts in the code repositories. FIG. 11 is a screenshot of a GUI displaying an IaC scan. Further, posture control provides continuous monitoring and real-time security postures of individual compliance benchmarks based on the changes made in code repositories, CI/CD tools and data ingested at set intervals from the discovery modules.

Correlation

The various findings and discovery modules (defense systems) disclosed herein include correlated policies and alerts. Based on the invalid findings and risks determined by security policy findings, the correlated policies allow systems to generate alerts on the uniquely identifiable resources from the various multi cloud CMDBs. Alert rules can be configured as to receive a subset of required alerts on one or more configured communication channels (i.e., internet based messaging platforms, Short Messaging Service (SMS), Email, etc.).

Figure 12:
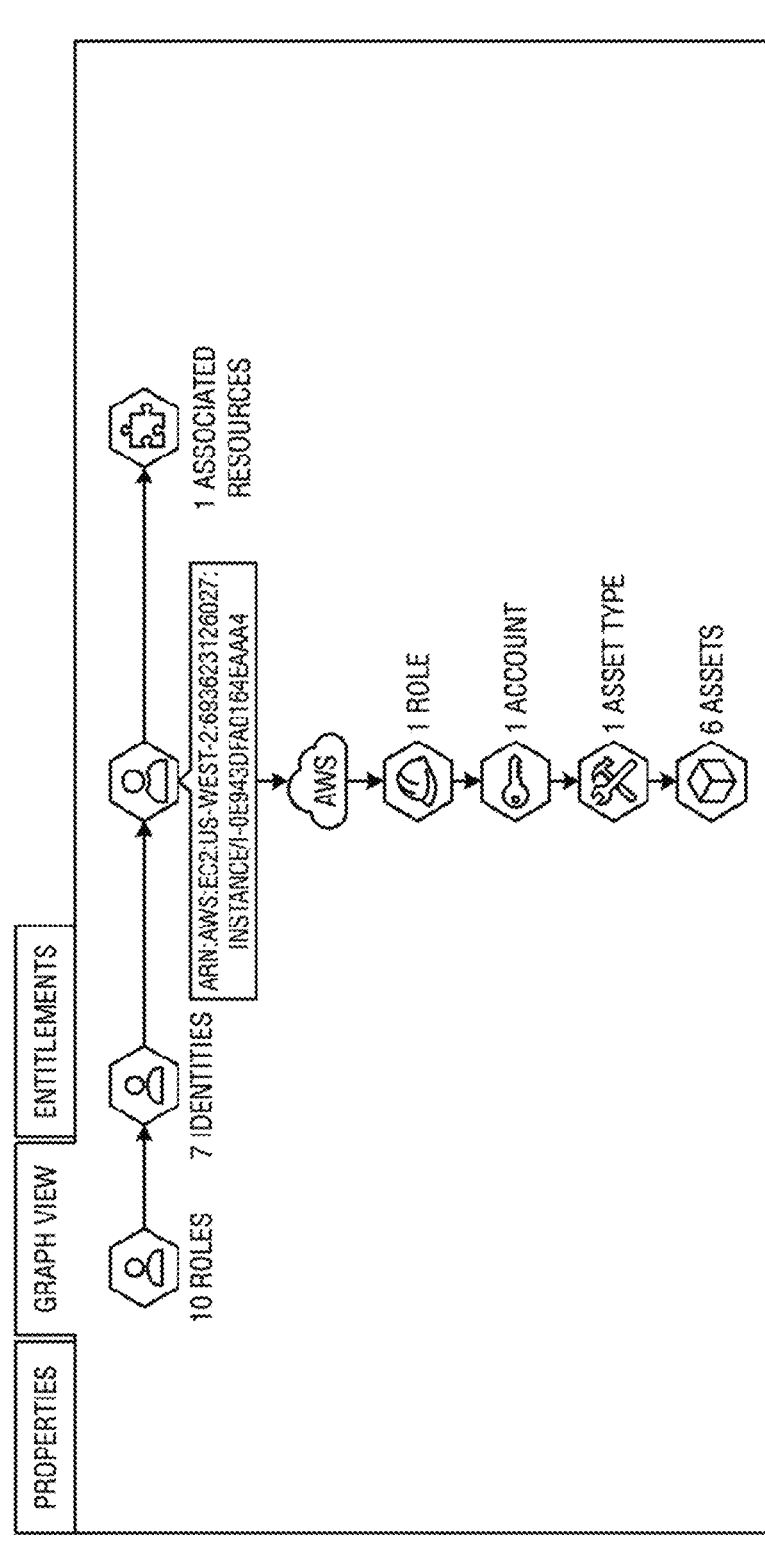
FIG. 12 is a screenshot of a GUI displaying a visualization of compliance tracking.

FIG. 12 is a screenshot of a GUI displaying a graphical visualization correlating relationships in a cloud environment. Various examples of correlated policies include an instance with powerful access permissions that is exposed to the public. Compromising such an instance can give an attacker a wide attack surface and access to resources. An attacker can gain access to the instance because it is exposed to the internet, and can thus access resources due to instance privileges. An instance such as this with high privileges has a higher impact if it is compromised. Another example includes creating credentials for a privileged service principal, which is seen as a risky activity. Various rules can detect when credentials are created for a privileged service principal, because the credentials can be used to access an account from the internet, thus bypassing authentication controls. Further, rules can detect when a bucket object level encryption key is set to an external key. If the external key is owned by an attacker, the attacker can later block access to the key and lockout the bucket owner from accessing the objects. It will be appreciated that the examples set forth in the present disclosure are non-limiting, and other rules and correlations are contemplated by various embodiments.

Analytics

Figure 13:
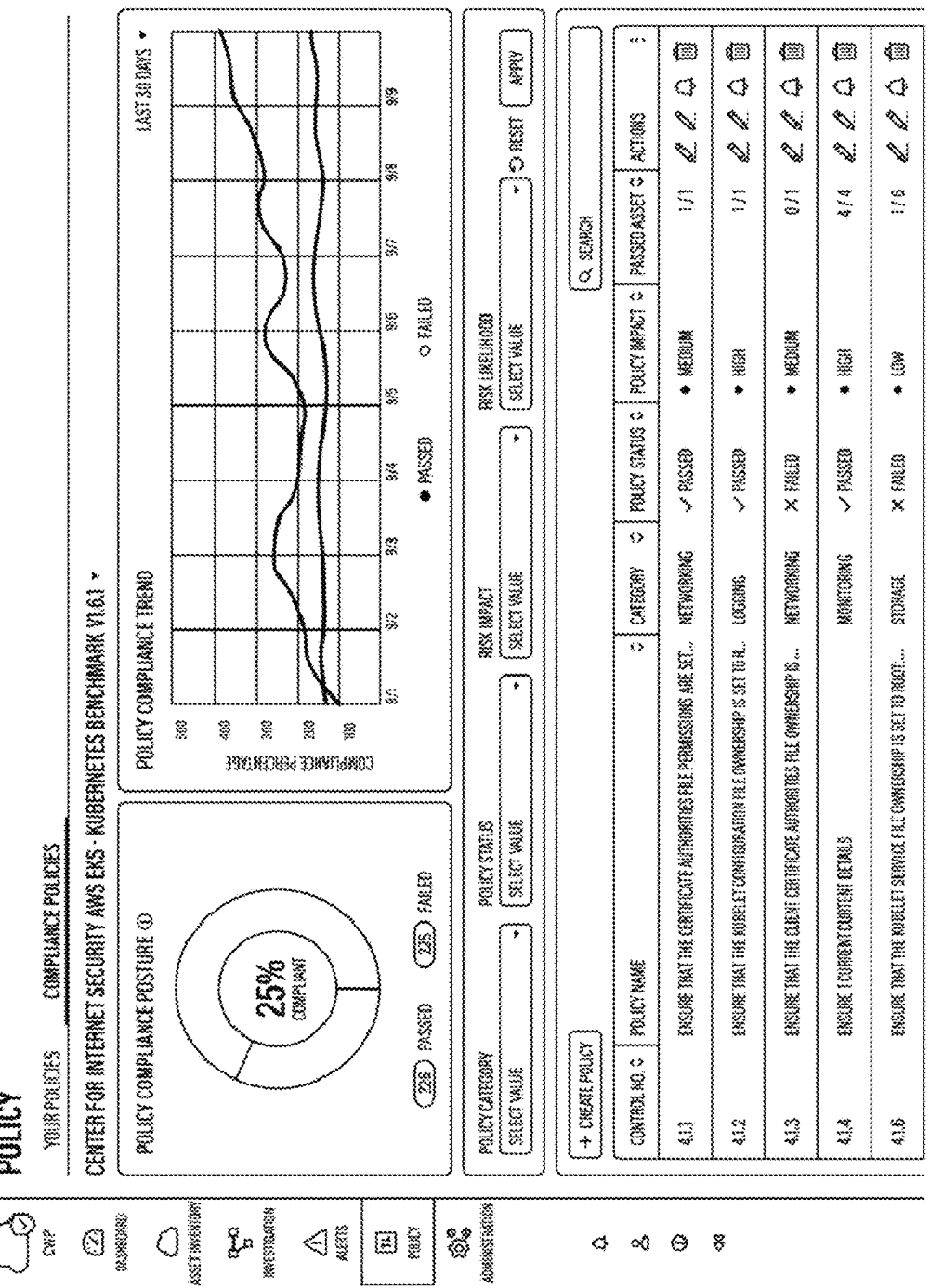
FIG. 13 is a screenshot of a GUI displaying a page for entitlement management and least-privilege enforcement.

Various embodiments of posture control can provide informative analytics which include high impact risk correlation and timelines across all discovery modules. As stated previously, embodiments of the present disclosure are adapted to monitor compliance via various compliance policies. In various embodiments, continuous compliance posture tracking takes place. FIG. 13 is a screenshot of a GUI displaying a visualization of compliance tracking. The GUI provides the ability to view the continuous tracking and graphically view policy compliance trends over a period of time. The visualization can include one or more graphs representing policy compliance posture, policy compliance trends, and the like.

Figure 14:
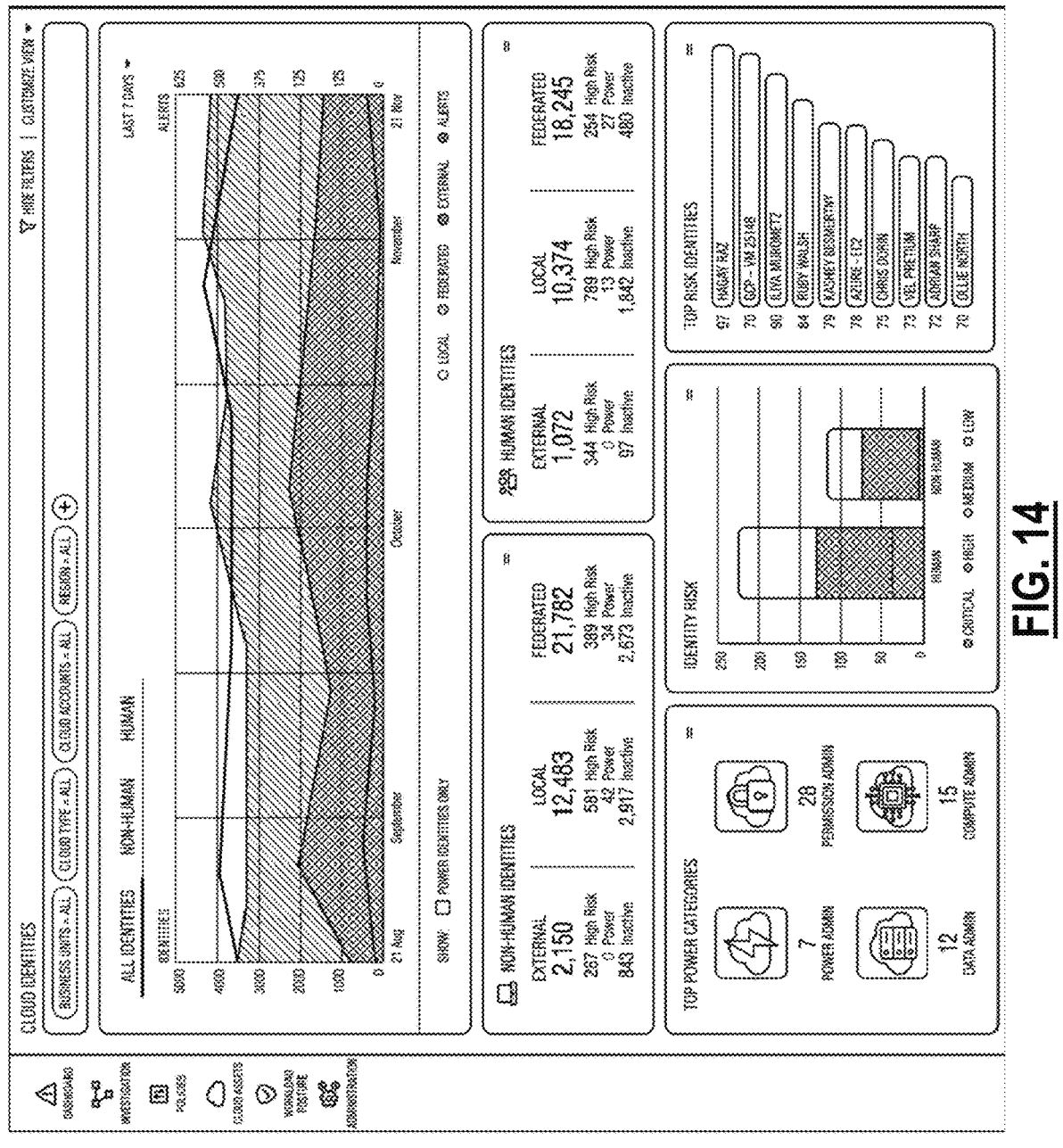
FIG. 14 is a screenshot of a GUI displaying a page for determining identity entitlements.

FIG. 14 is a screenshot of a GUI displaying a page for entitlement management and least-privilege enforcement. The data displayed in FIG. 14 includes a data enriched identity inventory for the cloud environment. This provides visibility of human and non-human identities, allows an understanding of identity origin for local/federated/external identities, and catalogs human and non-human identities by their permission levels in different accounts. Further, the data can allow easy detection of highly privileged identities and allow assessment of their permissions. All implicit and explicit entitlements can be identified. Also, excessive permissions assigned to non-human identities can be detected. A risk based prioritized view can allow visualization of only important high risk issues as well as identities which are considered high risk, thus reducing the number of alerts an operations team has to deal with.

Figure 15:
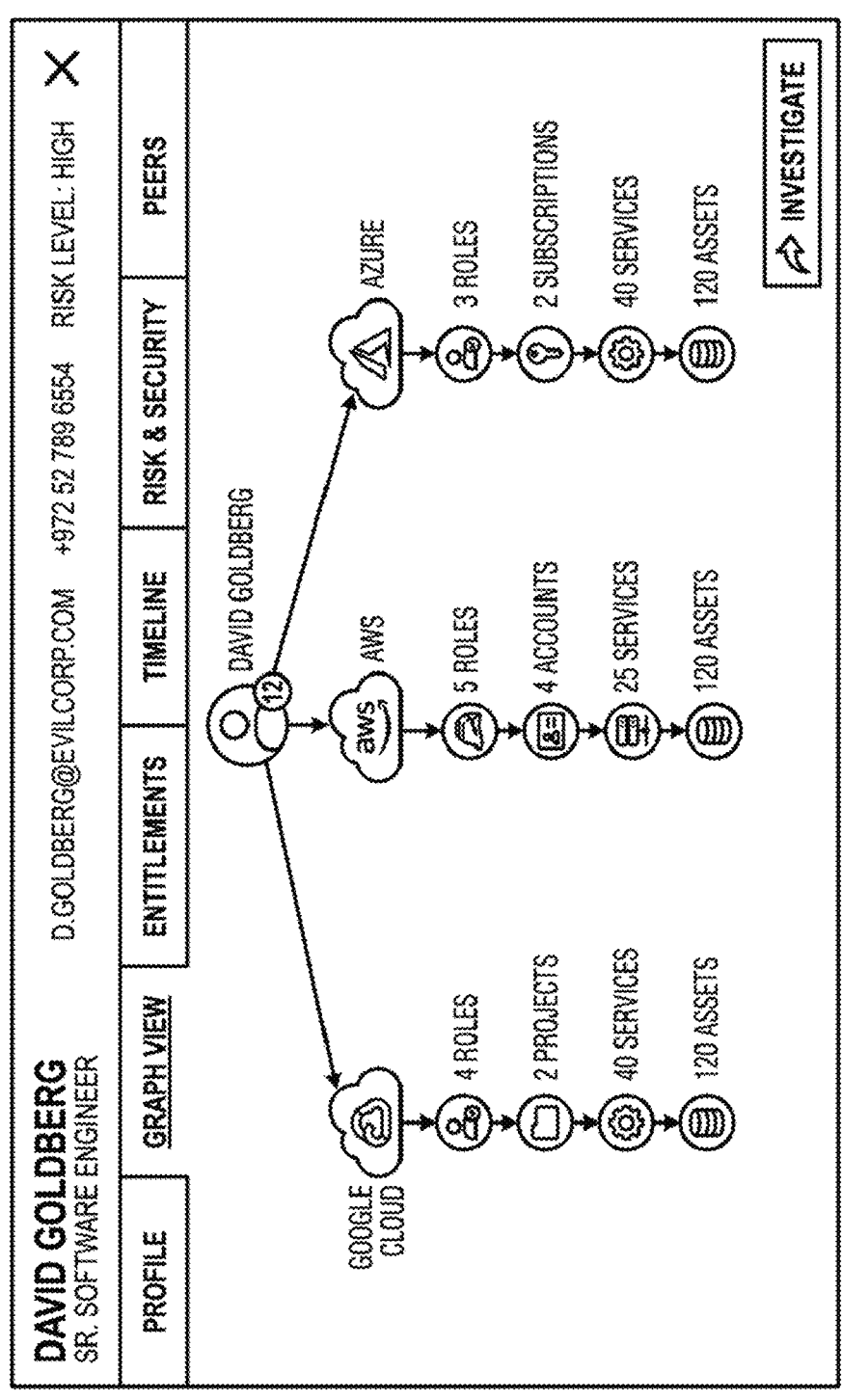
FIG. 15 is a screenshot of a GUI displaying a profile page for a specific identity.

FIG. 15 is a screenshot of a GUI displaying a page for determining identity entitlements. The identity shown in FIG. 15 can be considered a high risk identity. The identity has plurality of roles with access to multiple services and assets within multiple cloud environments. In various embodiments, an identity with such a high number of entitlements is considered high risk while other factors are considered as well.

Figure 16:
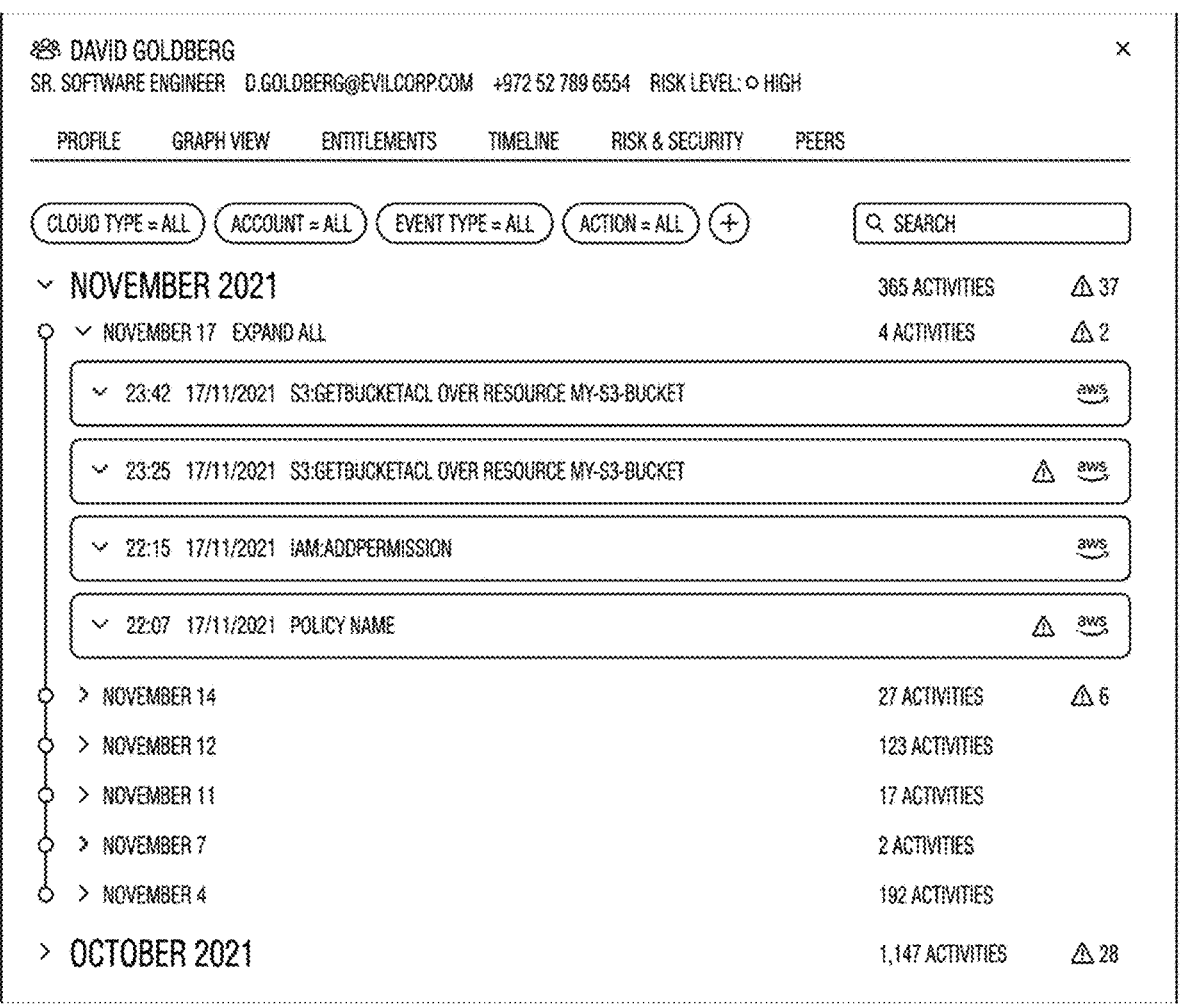
FIG. 16 is a screenshot of a GUI displaying a profile page for a specific identity.

FIG. 16 is a screenshot of a GUI displaying a profile page for a specific identity. The profile page provides various data associated with the identity. The data can include an activity timeline which provides insight into activities performed by the identity, entitlement/configuration changes applied to the identity, and any resulting alerts. Such insights provide a complete picture of an activity, such as who performed the activity, what activity was performed, when was the activity performed, and how was the activity performed.

Figure 17:
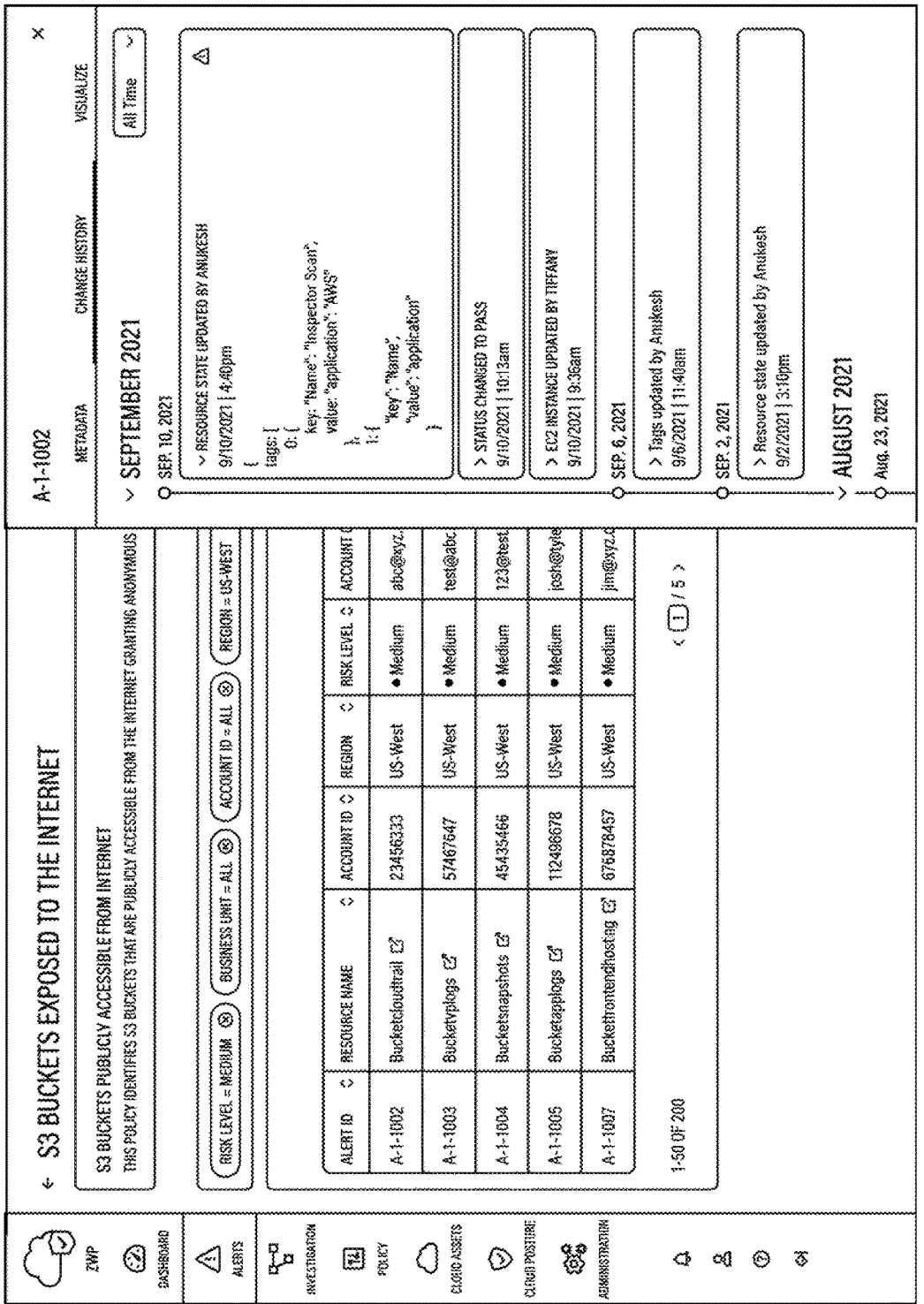
FIG. 17 is a screenshot of a GUI displaying build-time alerting and providing guided remediation.
Figure 18:
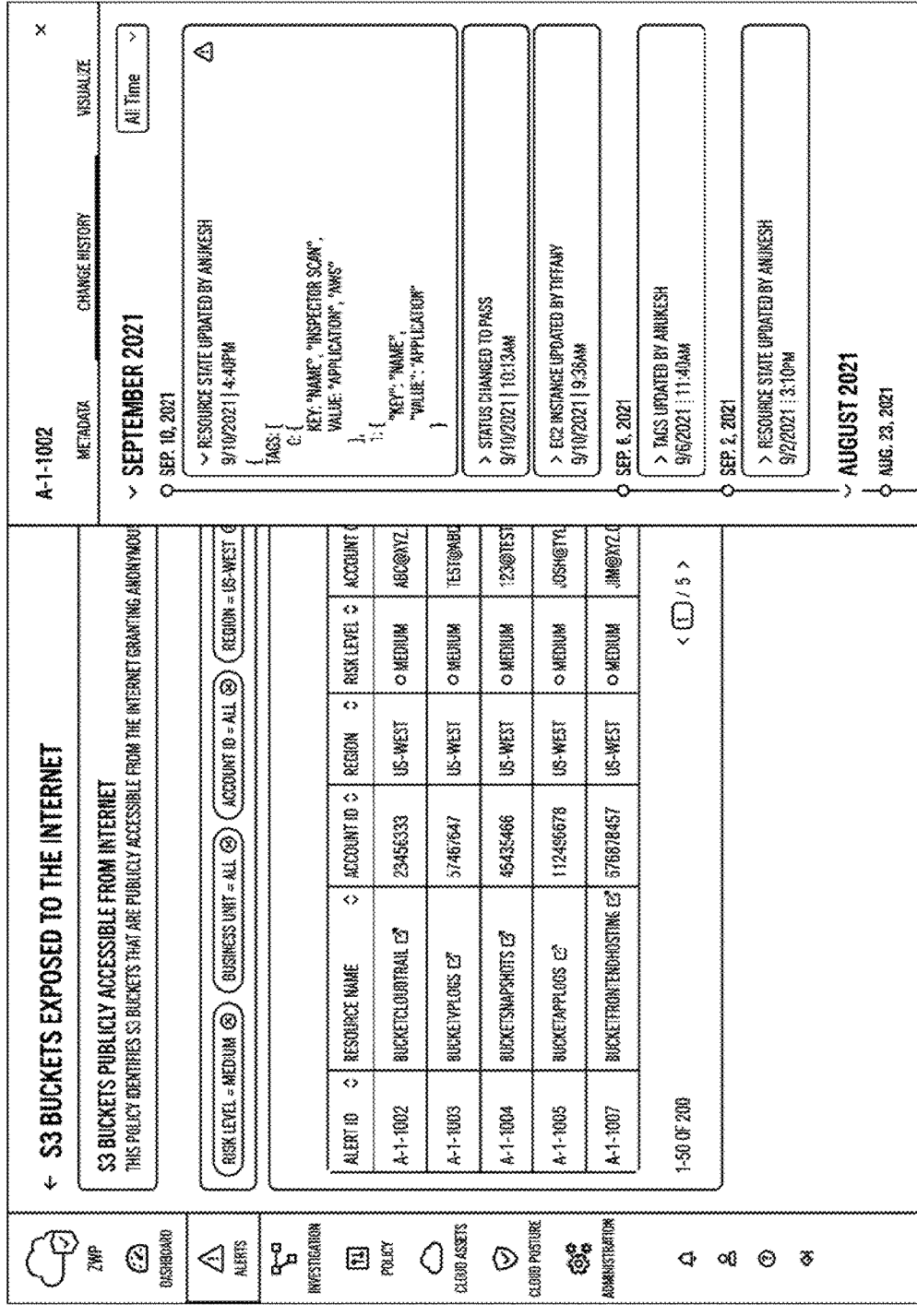
FIG. 18 is a screenshot of a GUI displaying run-time alerting and providing automated remediation.

FIG. 17 is a screenshot of a GUI displaying build-time alerting and providing guided remediation. The display provides various alerts associated with one or more scanned plugins with associated risk level. It additionally provides a guide for remediation presenting a recommended remediation procedure. FIG. 18 is a screenshot of a GUI displaying run-time alerting and providing guided remediation. Similarly, the display provides various alerts with associated risk levels.

Figure 19:
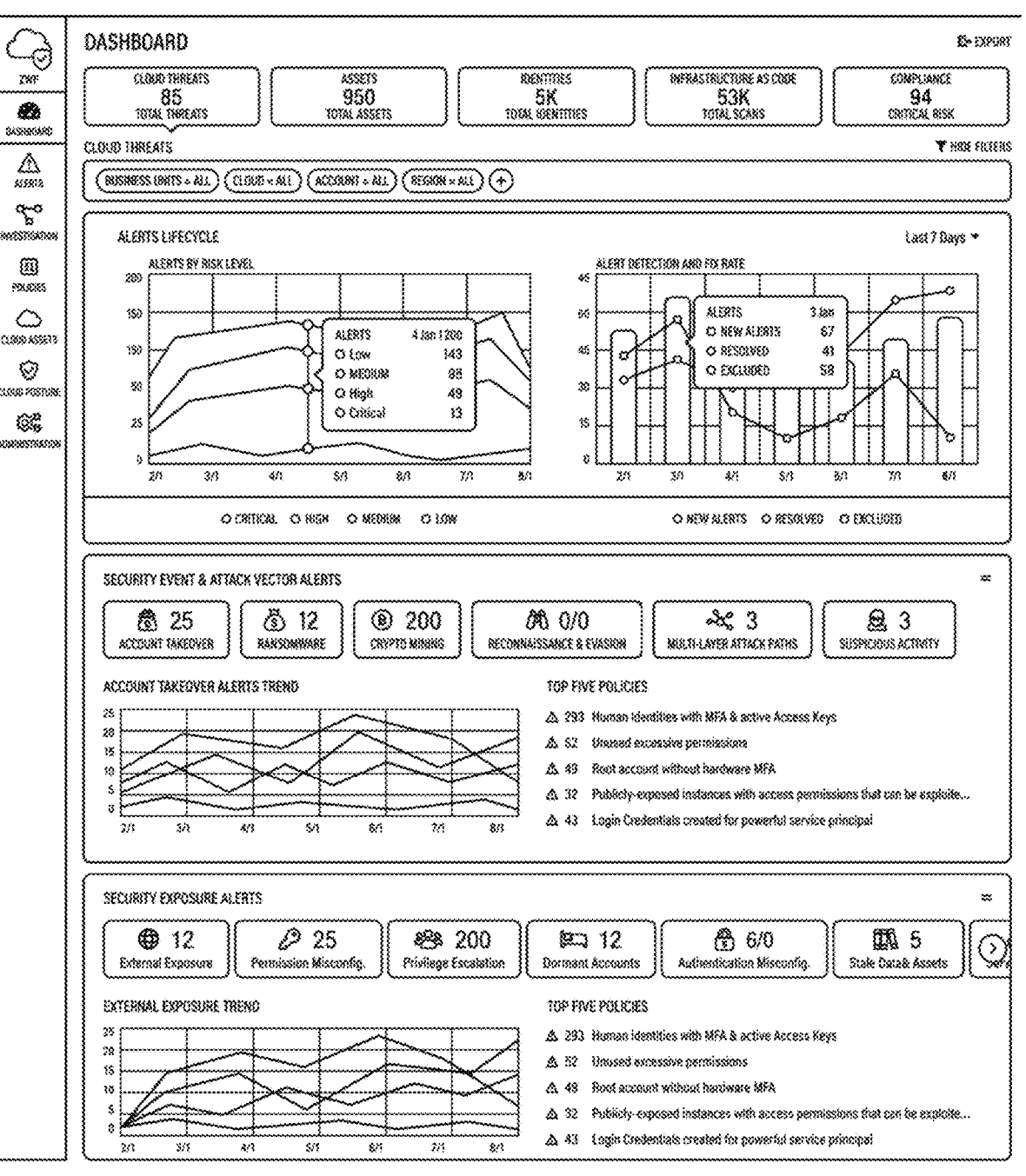
FIG. 19 is a screenshot of a GUI displaying threat detection and risk prioritization.

FIG. 18 is a screenshot of a GUI displaying threat detection and risk prioritization. The visualization shown in FIG. 19 shows various security events and security exposures. The security events include a plurality of smart rules identifying various attack scenarios. These can be grouped by common security themes for ease of mapping of risky areas. This allows easy prioritization of urgent items for quick attention and remediation. An investigation path is further provided with complete details for each attack.

The security exposure provides complete security posture coverage and eliminates bombardment of alerts via smart policies for simple and advanced attack vectors. They can further be categorized for ease of access and follow-up.

Posture Control Process

Figure 20:
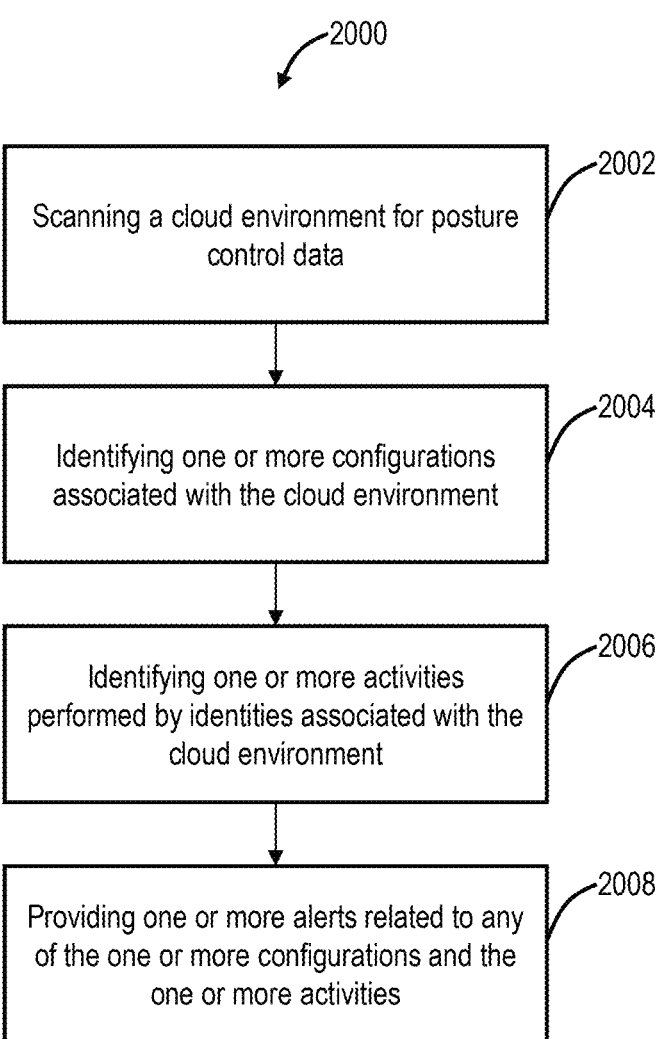
FIG. 20 is a process of posture control for cloud environments.

FIG. 20 is a process 2000 of posture control for cloud environments. The process 2000 includes steps of scanning a cloud environment for posture control data (step 2002); identifying one or more configurations associated with the cloud environment (step 2004); identifying one or more activities performed by a plurality of identities associated with the cloud environment (step 2006); and providing one or more alerts related to any of the one or more configurations and the one or more activities (step 2008).

The process 200 can further include wherein the one or more alerts include alerting to a combination of a misconfiguration and an activity as a risk. The posture control data can include any of assets, identities, network flow logs, activities, and code repositories in the cloud environment. The cloud environment can be any of a run-time cloud environment and a build-time cloud environment. Prior to the scanning, the steps can further include configuring one or more discovery modules. The posture control data can include any of historical data and real-time data. The steps can further include providing a Graphical User Interface (GUI) displaying the identified configurations and activities. The GUI can include a graphical representation of policy compliance trends in the cloud environment. The GUI can include a timeline of activities associated with any identity of the plurality of identities. The GUI can further include a risk level associated with each activity in the timeline.

Multi-Cloud Network Analysis and Threat Intelligence Correlation

Multi-cloud environments encounter massive amounts of network traffic to and from the network interfaces in Virtual Private Clouds (VPCs). The network traffic captured, further referred to as "network flow logs" provide critical and valuable information about the network. These network flow logs, or simply flow logs, can help to uncover useful insights as well as potential threats. Such potential threats that can be uncovered include finding restrictive security groups, outbound malicious traffic, monitoring inbound traffic and metadata of the traffic, uncovering malicious crypto mining activities using the VPCs in the cloud environment, and other potential threats of the like. Such flow log data is typically captured by popular cloud service providers (i.e., Amazon Web Services (AWS), Microsoft Azure, and Google Cloud Platform (GCP)). Various attributes of the network flow logs differ for each CSP; however, all the flow logs are bound by fundamental concepts of computer networks. The network flow logs captured in the active cloud environment can form large data structures. There is a need to capture the raw network flow logs and derive useful insights, such as threat intelligence, using advanced data engineering and machine learning methods. The present disclosure provides solutions to capture and derive the threat intelligence from network flow logs in various CSPs.

Typically, a flow log structure includes a 5-tuple format for every network interface irrespective of the specific CSP. An example flow log includes a source IP address, source port, destination IP address, destination port, and the transport protocol. Apart from the mentioned flow log data, time is associated with every event along with the network interface information, whether traffic was accepted or rejected and is quantized in terms of memory and number packets transmitted. Logging such network level information would lead to a high cost of storage. In order to mitigate such storage costs, aggregation and sampling concepts are introduced to help in reducing the burden of storage and processing. Because traffic can be observed from the sender or receiver's end, it is described differently for every CSP.

In response to network flow logs being enabled, i.e., through the VPC network, log files are saved on the block storage service of the CSP. Files are stored in such a way that there are folder partitions based on the aggregation time interval. This makes it possible to fetch files for a certain time period. Log files can include Comma-Separated Values (CSVs), Parquet, JavaScript Object Notation (JSON) or any other widely accepted format.

In current implementations, network flow logs are configured in the customer multi-cloud environment. Although, there is no intelligent way to determine hidden insights such as malicious network traffic or unwanted crypto mining activities on such cloud environments. Utilizing the posture control onboarding techniques disclosed herein, customer network flow log buckets can be onboarded so that network flow logs can be scanned and processed using posture control data pipelines to derive required/desired insights. Various embodiments of the present disclosure provide novel approaches to scan network flow log data, derive a delta (find new files), enrich the flow logs, and aggregate the data to find actionable insights.

Network Flow Log Capture

In various embodiments, methods use a custom schema for configuring network flow log buckets, so that all required fields are captured and processed in the cloud environment traffic. A posture control collector service scans and captures new flow log files with the custom schema for each CSP.

Again, as described for flow log storage, the log files are partitioned into folders based on the time of an event (i.e., a "time stamp" associated with the log/event). Every new file is captured and ingested in the raw data layer. The posture control pipeline makes use of authentication credentials captured during the onboarding process to scan the customer network flow log bucket and find a delta from the list of files. This helps keep track of new files, and allows the posture control data pipeline to always handle every new event. Based on the current time, systems can keep track of new files that are being generated. This reduces the overhead by polling a small subset of files. Network and permission based failures are expected, thus a retry mechanism is also contemplated. A file status (for example, Listed, In Progress, Downloaded, Raw Transform, Completed, Failed, File Not found 404, Permission Denied 503) is maintained to make sure every new file will be processed further for enrichment and aggregation. The file status is updated at every stage of the pipeline, such as in-progress to downloaded when it is downloaded from a customer bucket, to raw transform in the raw data ingestion phase, or completed when the file is captured in the ephemeral data lake for enrichment and aggregation.

The files can be processed in batches, such as 100 files in one batch, to make sure the systems can handle enough volume in the pipeline during all of the stages. The number of new files in each scan will vary, and the posture control data pipeline is intelligent enough to recognize new files and existing files with incomplete or error status so that it can be considered again for transformation. The posture control data pipeline handles the scenario of corrupt files or incorrect flow log files with missing critical information. All such files are put in an "error" status, and the posture control data pipeline utilizes a retry mechanism to process such files. For example, systems can reprocess network flow logs which include corrupt files and files with missing critical fields. All files which complete the successful raw transformation phase are stored in an ephemeral data lake for some retention period. Although, all files are stored in the raw layer with a certain Time-To-Live (TTL) period to make sure the original network flow log data is available for validation or fail-safe.

Network Flow Log Enrichment

Once the network flow logs are captured in the raw data layer, the data is further processed by posture control data pipelines to enrich critical fields from the flow logs. As disclosed in previous sections of the present disclosure, posture control systems already capture additional information related to cloud assets, resources, and identities. This can be in the form of inventory information in data stores (i.e., Snowflake or Datalake). This data is used for the enrichment of critical fields in the network flow logs. Various enrichment examples are further described, and include source & destination IP enrichment, instance enrichment, and VPC enrichment.

For source and destination IP enrichment, network traffic has 2 important attributes. These attributes include source and destination IP addresses. It is important to identify the geographical location information of these IP addresses and categorize them based on location information. Various fields can help derive an actual physical vs virtual IP addresses high risk network traffic based on location or determined malicious traffic. In various embodiments, these fields can include the following.

IS_ANONYMOUS_PROXY: To determine whether the IP address is used by an anonymizing service.

LATITUDE: Approximate latitude of the location.

LONGITUDE: Approximate longitude of the location.

ACCURACY_RADIUS: The radius in kilometers around the specified location where the IP address is likely to be.

CITY_NAME: City name of the location.

TIME_ZONE: Time zone of the location.

CONTINENT_NAME: Continent name of the location.

COUNTRY_NAME: Country name of the location.

IS_IN_EUROPIAN_UNION: If the country associated with the location is a member state of the European Union.

For instance enrichment, network flow logs also capture instance information for the traffic. Various fields can be added for instance enrichment using the data already captured by posture control pipelines. In various embodiments, these fields can include the following.

RESOURCE_NAME: Asset name or resource name.

TAGS: Tags assigned to cloud assets or resources.

GLOBAL_POWER_SCORE: Power score calculated by posture control machine learning teams for identities.

PUBLIC_EXPOSURE_TYPE: Public exposure captured by posture control pipelines for resources.

PUBLIC_EXPOSURE_REASON: Reason for public exposure.

EXPOSURE_FIRST_DETECTED: First time exposure detection.

EXPOSURE_DETAIL: Additional details or metadata about public exposure information.

OPEN_PORTS: Open ports for network traffic.

INSTANCE_PROFILE: Cloud metadata for instance.

One of the most important attributes of a network traffic is the VPC details. The network flow logs provide the information about network traffic to and from the network interfaces in VPCs. Posture control pipelines capture and store the metadata details like CIDR BLOCKS or DEFAULT SECURITY GROUPS about the VPC in posture control data stores. This metadata helps to derive additional information about the VPC for threat intelligence.

Network Flow Log Threat Intelligence

Again, the present multi-cloud network analysis provides the ability to detect, investigate and respond/remediate the threats encountered by posture control management. A detection phase provides correlation of threats across different defense services such as posture control modules, Cloud Security Posture Management (CSPM), Cloud Infrastructure Entitlement Management (CIEM), Infrastructure as Code (IaC), container security, and Operating System (OS) vulnerabilities.

The following detection capabilities, for threat identification, are contemplated in various embodiments. VPC resources receiving connections from the Internet (resources that are supposed to be private). Identifying resources that are receiving connections on non-standard ports (high random ports). Detect data exfiltration attempts when a large amount of outbound traffic is seen in comparison to historical data. Detects inbound & outbound connections from specific geo-locations. Detects inbound accepted connections from TOR exit nodes & IP addresses previously used by malware and Advanced Persistent Treats (APTs). Detect outbound communications to TOR exit nodes and previously known malicious IP's and domains (C&C). Detect outbound communications to crypto miner pools. Detect suspicious Domain Name System (DNS) queries to Domain Generated Algorithms (DGA) & domains associated with crypto miner pools. Detect port scanning/probing activity on publicly exposed instances. Tie-in the visibility of flow to publicly exposed resources allowing the user to easily view the traffic flows of the publicly exposed resources. IP enrichment is necessary, i.e., determining country, region, etc. and will come from threat intelligence systems. The detection can further uncover impossible time travel and teleportation not related to VPC flow logs (i.e., activity based).

To investigate the correlated information, the module provides the customer with an ability to bulk export to cloud storages, on premises file storages, and Security Information and Event Management (SIEM) Tools. The customer also has the ability query (Structured Query Language (SQL)) via the posture control web portal (as described in previous sections herein), and fetch data via Representational State Transfer (REST) API integrations.

The network flow log module allows the customer to receive a feed of detected threats via integrations with Information Technology Service Management (ITSM) tools, instant communication channels such as Slack, Teams, SMS, Email, and SIEM tools.

Network Analysis and Threat Intelligence Correlation Architecture

Figure 21:
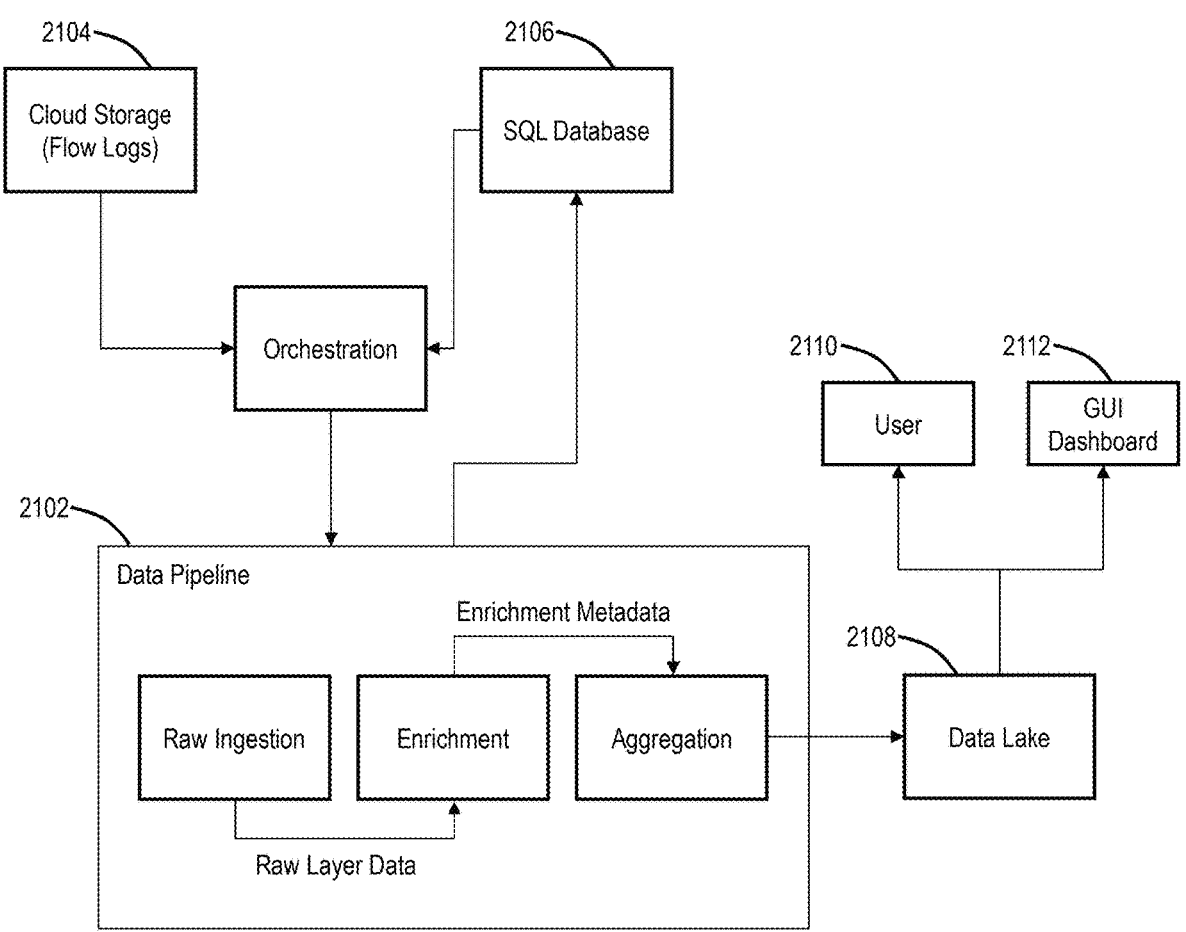
FIG. 21 is a flow diagram of a data pipeline architecture.

FIG. 21 is a flow diagram of a data pipeline architecture. The figure shows a data pipeline design to ingest, enrich, aggregate, and store the petabyte scale level network flow data. This data pipeline captures the data in a required format and stores it in data lake tables, such as Iceberg or Delta Lake, for further analysis. Different users can query this data for research, data science and analytics to build threat intelligence, and notify the cloud users about the malicious traffic.

The data pipeline 2102 ingests raw data, the data being customer network flow logs 2104 orchestrated with the SQL database 2106. Once the data passes through the ingestion, enrichment, and aggregation phases, the data pipeline stores the data in data lake tables 2108. This data is made available to users 2110 and can also be viewed through a GUI dashboard 2112 for further analysis and allowing users to query the data for research.

The network flow log module in posture management systems allows customers to ingest IP address ranges that they own via IP Address Management (IPAM) tool integrations or uploads of lists of IP addresses. The ingested IP address can be placed in an allowed list via configurations to avoid receiving false positives from customer owned on-premises networks or any proxy locations that the customer wishes to allow.

Figure 22:
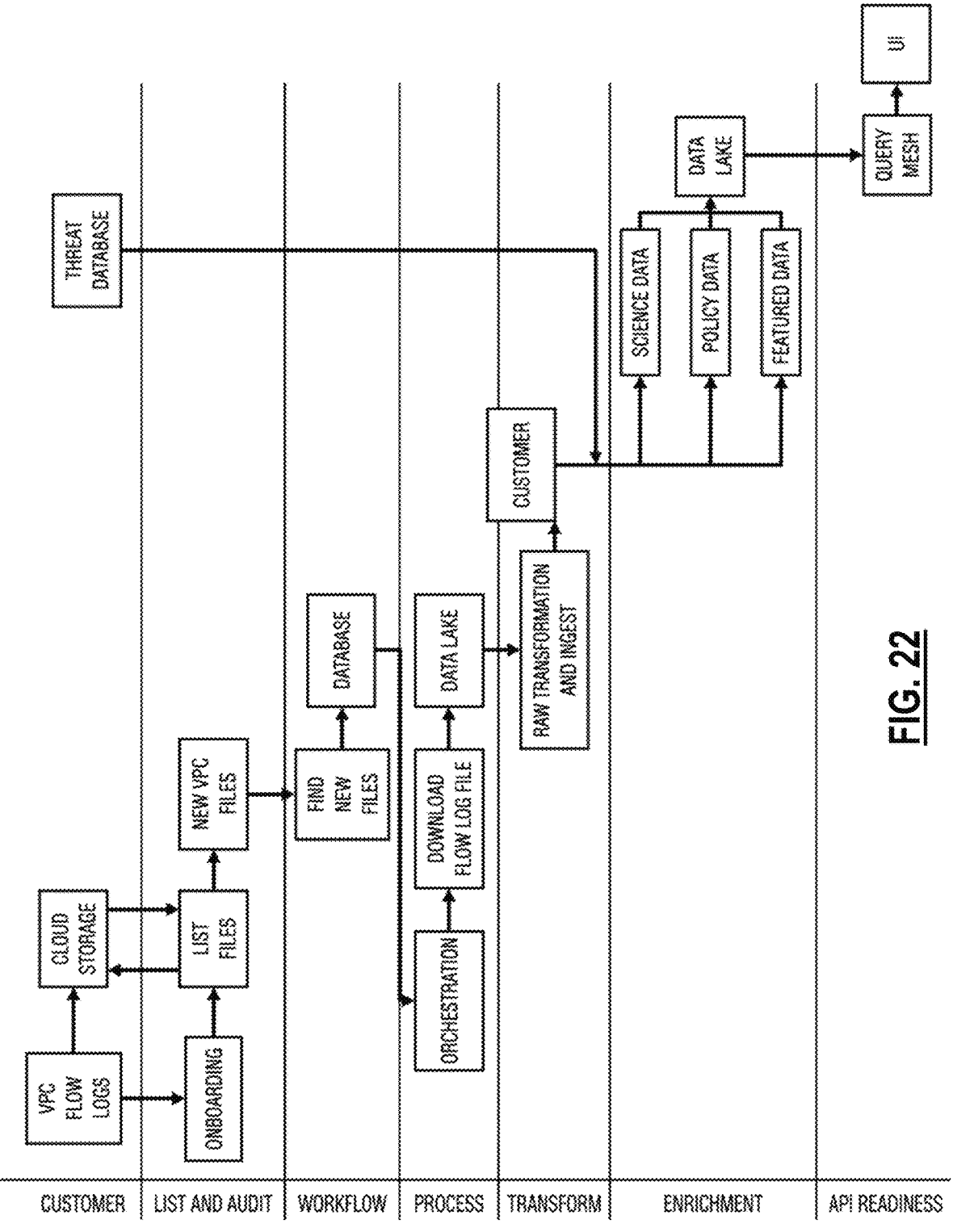
FIG. 22 is a flow diagram of an architecture for multi-cloud network analysis for threat intelligence correlation.
Figure 23:
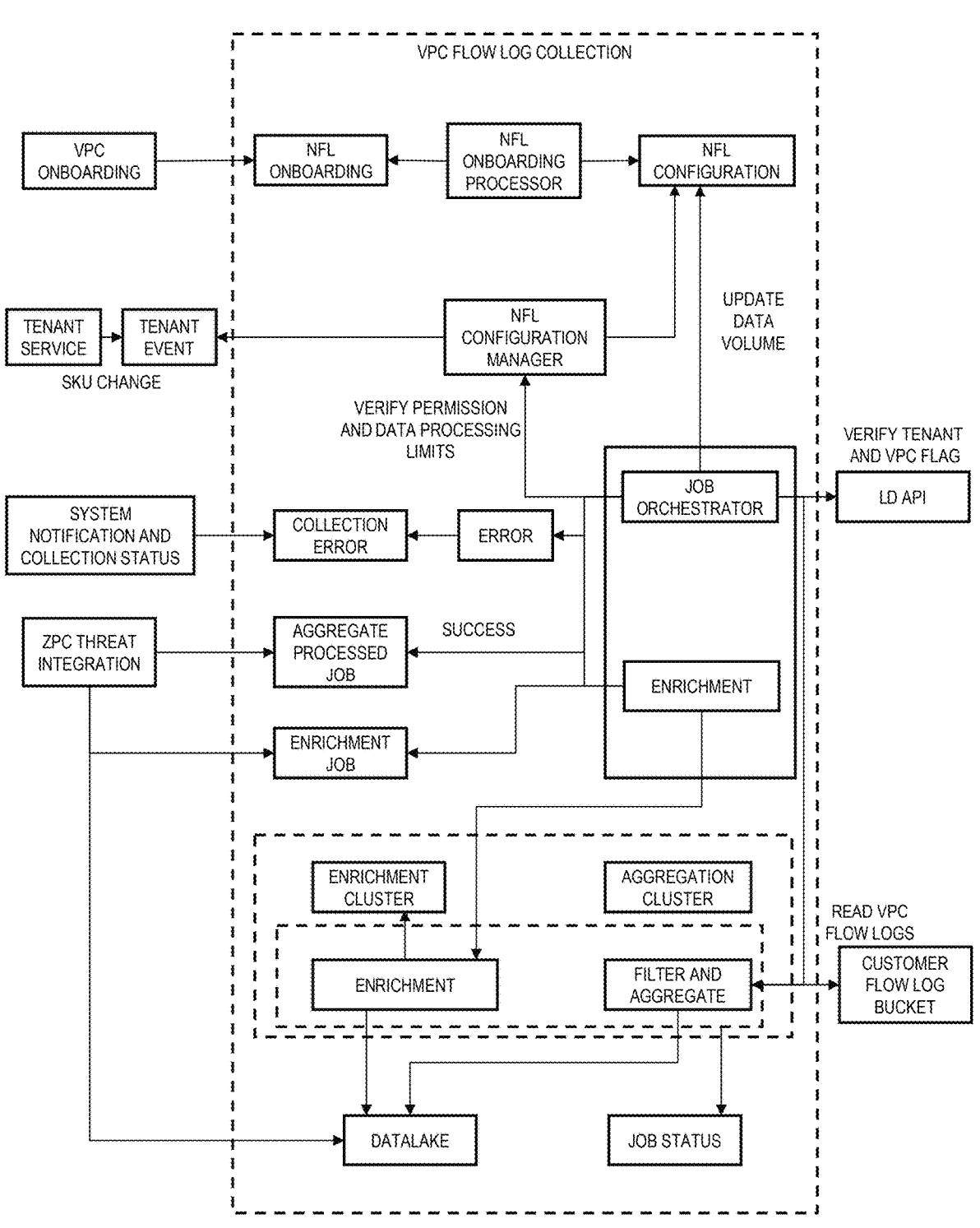
FIG. 23 is a flow diagram of an architecture for multi-cloud network analysis for threat intelligence correlation.

FIGS. 22 and 23 are flow diagrams for the present multi-cloud network analysis architecture for threat intelligence correlation. In various embodiments, VPC flow logs are stored and onboarded, where network flow logs are scanned and processed to derive required insights. The systems scan and capture new flow log files via a custom schema for each CSP. Every new file will be captured and ingested in the raw data layer. The files are then processed in batches and all the files which complete the successful raw transformation phase will be stored in an ephemeral data lake for some retention period. Alternatively, systems have a retry mechanism to process all files put in an "error" status. Once the network flow logs are captured in the raw data layer, the data is further processed to enrich critical fields from the flow logs. Threat intelligence from a threat database can be utilized in the enrichment phase for correlation and critical field enrichment. This data can then be further processed for specific purposes/activities, for example, science data, policy and research data, and feature specific data. Again, this data can be structured as a query mesh and provided to users via a UI.

Network Analysis and Threat Intelligence Correlation Process

Figure 24:
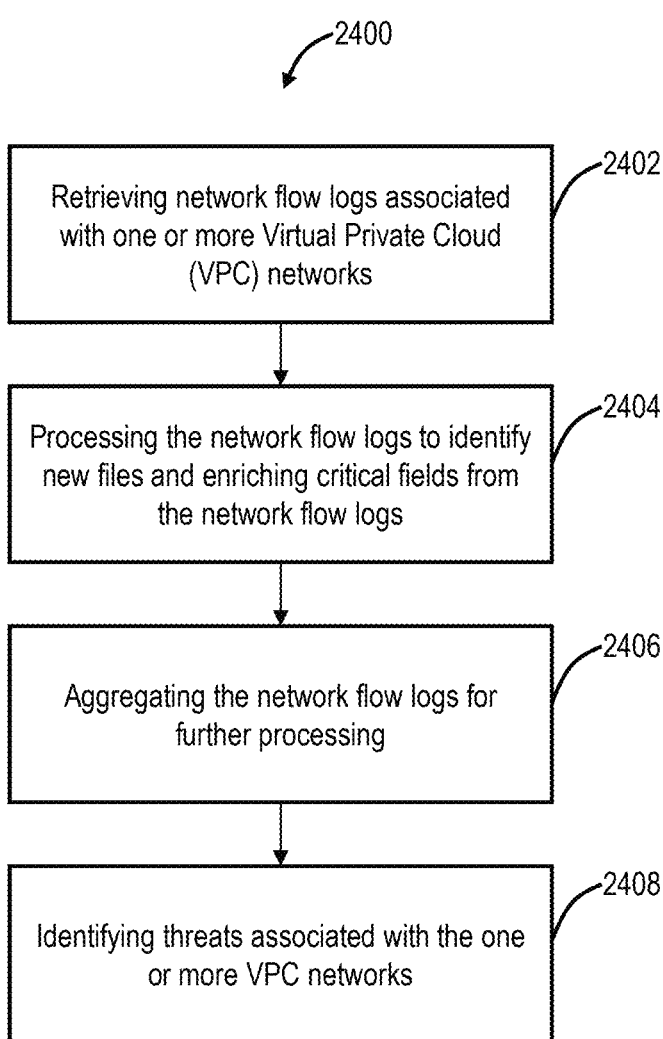
FIG. 24 is a process for network analysis and threat intelligence correlation.

FIG. 24 is a process 2400 for network analysis and threat intelligence correlation. The process 2400 includes steps of retrieving network flow logs associated with one or more Virtual Private Cloud (VPC) networks (step 2402); processing the network flow logs to identify new files and enriching critical fields from the network flow logs (step 2404); aggregating the network flow logs for further processing (step 2406); and identifying threats associated with the one or more VPC networks (step 2408).

The process 2400 can further include wherein the identifying includes correlating threats across a plurality of defense services. The steps can further include storing the retrieved network flow logs based on a time associated with each network flow log. The processing is performed based on a preconfigured custom scheme, the custom scheme identifying required fields for processing. The one or more custom schemes are preconfigured for one or more Cloud Service Providers (CSPs) associated with the one or more VPC networks. The network flow logs are processed in batches. A file status is maintained for each of the network flow logs, the file status indicating a status of each network flow log throughout the processing. The steps can further include providing a feed of identified threats via any of integrations with Information Technology Service Management (ITSM) tools, Security Information and Event Management (SIEM) tools, and instant communication channels. The steps can further include providing a Graphical User Interface (GUI) displaying the aggregated network flow logs. The steps can further include reprocessing network flow logs including corrupt files and files with missing critical fields.

Security Policy Framework

Traditionally, solutions such as Cloud Infrastructure Entitlement Management (CIEM) and Cloud Security Posture Management (CSPM) require security policies/scenarios to be represented directly as application code in a programming language or a combination thereof (e.g., C#, Python, SQL). This results in multiple limitations and challenges including a requirement for policy implementers to have direct access, knowledge, and experience with application code and corresponding technologies. Additionally, policy implementations are tightly coupled with the rest of the application and have a hard dependency on application technologies and execution environment, which cannot be easily transferred. Automatically generating new policy implementations can be extremely difficult because it requires generating, composing, building, and deploying application code). Further, as any application code written in a general-purpose programming language, policy implementations are subject to security, correctness, performance, and maintainability requirements, which greatly increase the amount of effort necessary for implementing and changing policies.

Other policy implementation methods include implementing policies in custom formats developed within enterprises which are supported by only their products. Such approaches similarly suffer from the above mentioned deficiencies and further complicate the dependencies between policy implementations in the custom format and the application which consumes it. This requires significant and continuous effort to implement, maintain, and update the format, making sure it provides all capabilities required for the policy implementation.

The present systems and methods provide a generic solution to express security policies to allow automated evaluation of these policies over various data. The present framework allows complete definition of security policies of arbitrary complexity. Such definitions are simple enough to be written and read manually or programmatically. The underlying policy evaluation model provides a plurality of layers of abstraction between the definition of the policies and the data layer. This decouples policy development from the technical details of data storage and processing. Furthermore, various embodiments are open-ended about the strategies of triggering policy evaluations and interpreting the results.

At the center of various cloud security systems such as ZPC are security policies which are automated security scenarios that are utilized to scan customer data for reporting threats, anomalies, or other alerts of the like. This is done, in the context of ZPC, to identify compliance violations and the like that must be remediated. The present framework allows one to define and write policies, keep stock of the plurality of policies, execute them over customer data, and aggregate their results in a way that can be presented to customers. In various embodiments, the present framework includes a compiler for policy language, a policy catalog, a policy evaluation module, and a query engine. The systems can include a GUI for allowing users to define policies and how the policies can be used to scan something.

In various embodiments, the present systems and methods allow users to define policies via an easy to understand policy definition language, for which the systems include a compiler that generates queries. This language provides a source of the strength and allows humans (e.g., security researchers) to define the policy without thinking/knowing about the details of its execution (i.e., query engines, environment, specific parameters from the receiver trigger, etc.). It allows the systems to dynamically choose the query engine to use depending on the execution scenario/environment, and to dynamically compile policy into the right dialect. It is also easy to programmatically generate policies in this language from the visual constructor offered to users via the GUI.

Figure 25:
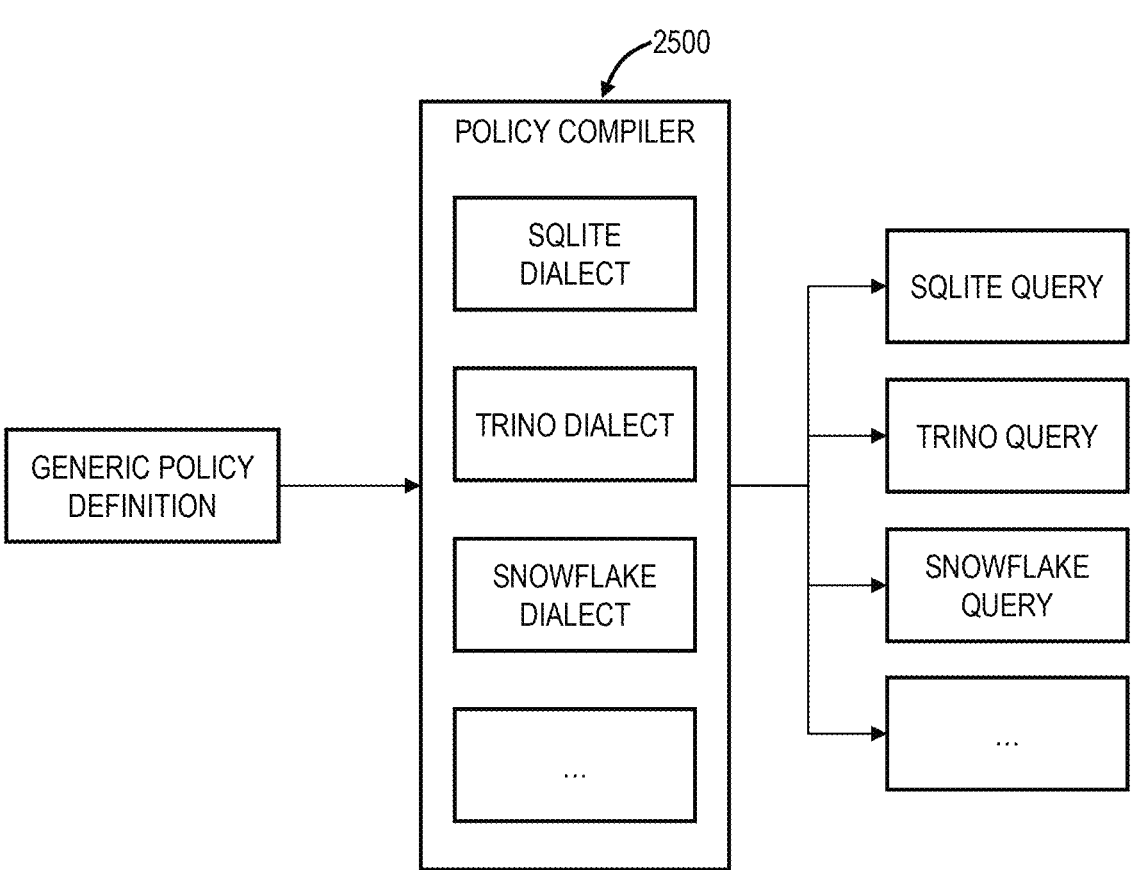
FIG. 25 is a flow diagram of an embodiment of a policy compiler.

FIG. 25 is a flow diagram of an embodiment of a policy compiler. The policy compiler 2500 allows to target different query languages and engines from the single generic policy definition. The policy compiler 2500 includes pluggable compilation dialects for each supported query engine. Additional dialects can be implemented to target other platforms with little to no change in the source policy definitions. For example, the policy compiler 2500 can take any policy definition, generated or user written, and compile and translate it into SQL. That is, the policy definitions are compiled and translated into a technical query that can be executed on a database.

Figure 26:
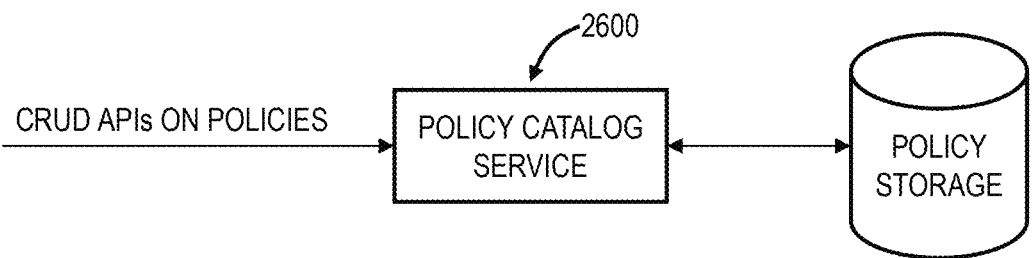
FIG. 26 is a flow diagram of an embodiment of a policy catalog service.

FIG. 26 is a flow diagram of an embodiment of a policy catalog service. The policy catalog service 2600 provides storage and retrieval APIs for existing policies. That is, the policy catalog service 2600 provides a means of taking all of the policies that are written and represent them on a UI and store them in a single location where they can be changed, removed, etc. In other words, the policy catalog service 2600 is a place where all policies can be stored and presented to users.

Figure 27:
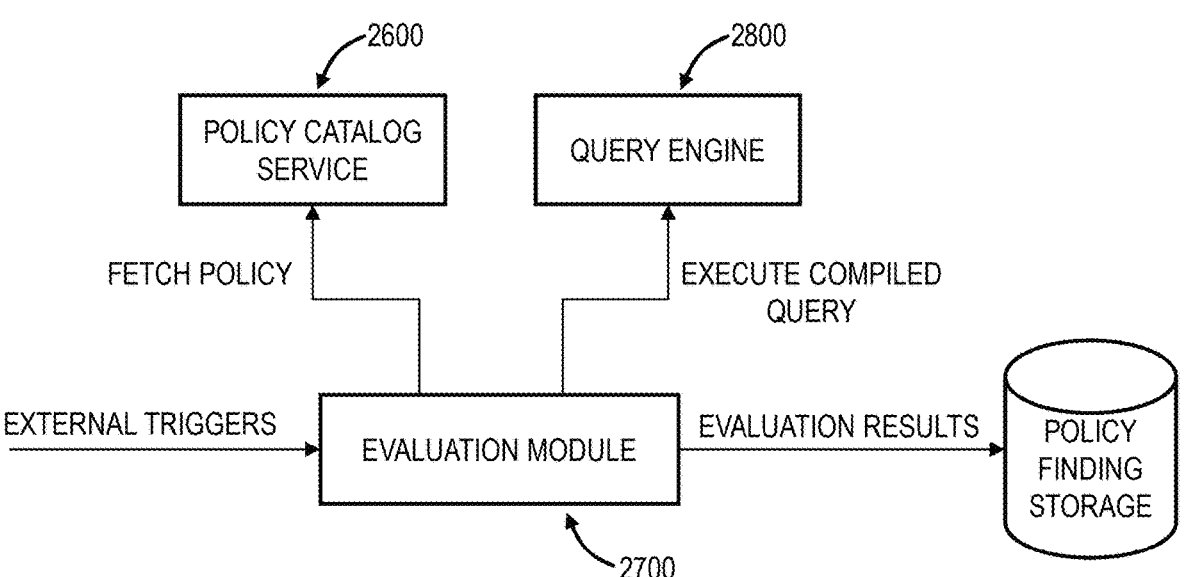
FIG. 27 is a flow diagram of an embodiment of an evaluation module.

FIG. 27 is a flow diagram of an embodiment of an evaluation module. The evaluation module 2700 is responsible for triggering policy evaluations, interacting with the query engine(s), and persisting the results of evaluation. External triggers include user or system events that call for policy evaluation or schedulers that run periodically. Evaluations include the compiler query outputs from the query engine 2800 combined with additional policy metadata from the policy definition (e.g., policy name and description). That is, the evaluation module 2700 takes the policies stored in the policy catalog service 2600 and applies them to some data based on the triggers. The data can be any specific data at any point in time.

Figure 28:
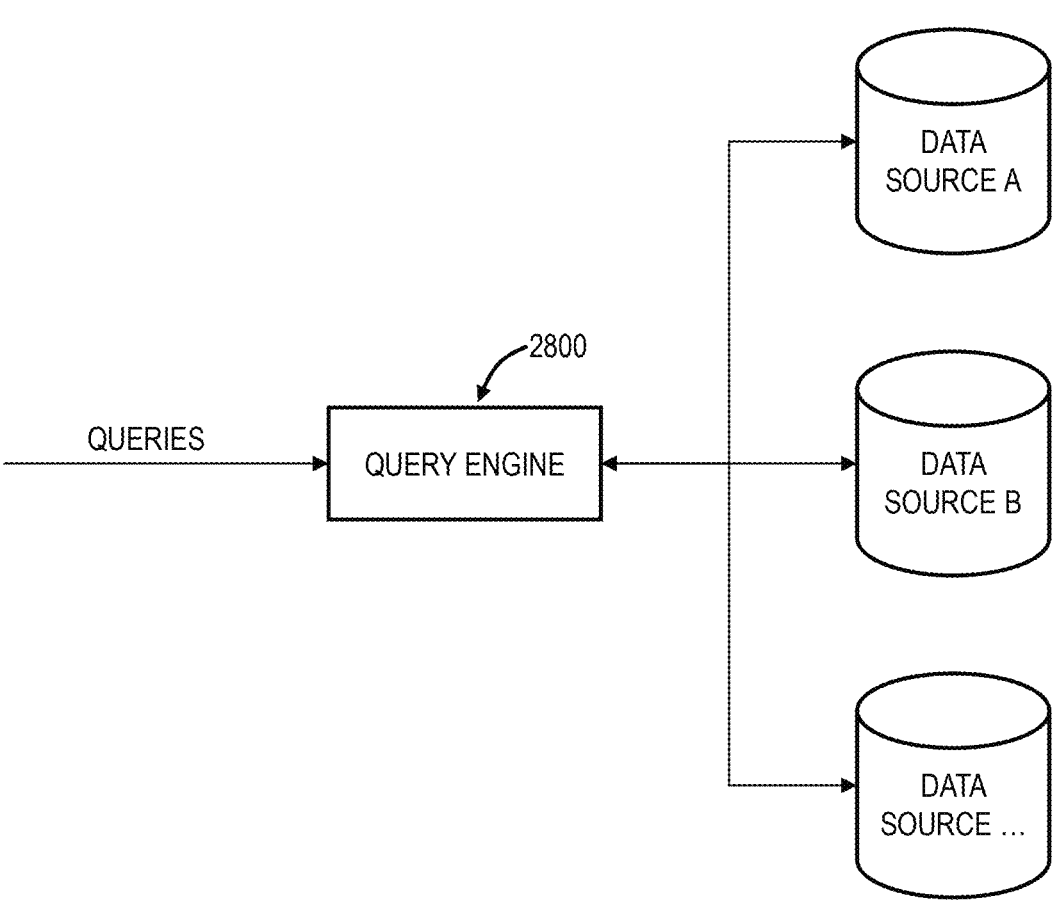
FIG. 28 is a flow diagram of an embodiment of a query engine.

FIG. 28 is a flow diagram of an embodiment of a query engine. The query engine 2800 enables a single point of access to all data available for analysis by the policies, using a query language supported as compilation target of the policy compiler 2500 (e.g., a specific SQL dialect such as SQLite). The query engine 2800 can be a part of a single data source as in the case of SQLite, or a standalone query federation/data mesh component such as Trino. For the Framework to operate, the query languages (e.g. SQL dialects, Cypher, Datalog) supported by the query engine 2800 must be available as compilation targets in the policy compiler 2500. Thus, the query engine 2800 interacts with the evaluation module 2700 to solve the problem of accessing data in a universal way. As shown in the figure, the present framework can be adapted to utilize data from a plurality of data sources for a single policy, wherein the plurality of data sources do not need to be the same type of data source.

Figure 29:
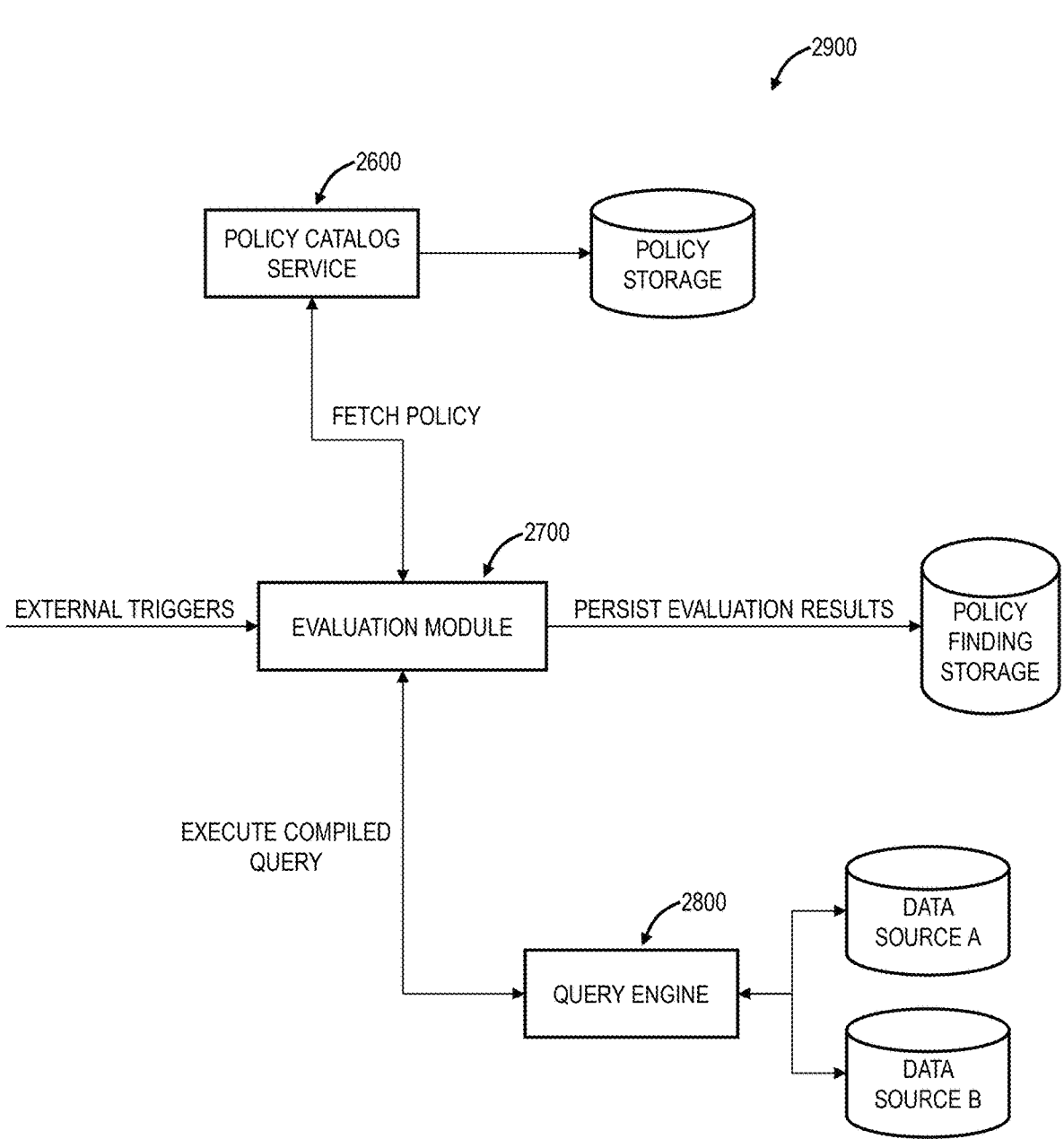
FIG. 29 is a flow diagram of an embodiment of the present security policy framework.

FIG. 29 is a flow diagram of an embodiment of the present security policy framework 2900. By combining the above components, a holistic view of the framework for security policy implementation and evaluation is provided. Again, this framework allows for transparent and unrestricted usage of any available data in various formats and storage systems, and exposes a powerful language API for policy definitions, which can be used directly by human specialists, or by programmatic policy generators. In various embodiments, the framework 2900 itself provides and maintains support for necessary compiler dialects, evaluation triggering and flow control, and persistence of results. This can all be performed without any knowledge or dependency on specific policy/data use-cases.

In the framework shown in FIG. 29, the policy catalog service 2600 contains all of the policies either provided by users or generated by various systems such as ZPC. The evaluation module 2700, in response to some trigger, fetches policies from the policy catalog service 2600. In various embodiments, the trigger can be based on a schedule that periodically performs tests, compliance checks, etc., or a collection of some data, i.e., based on receiving some data about a customer's infrastructure. That is, the trigger can be based on collecting flow logs, collecting posture control data, or any other data which requires processing for security purposes. Then, using the query engine 2800, it compiles a policy into the query and executes the query over customer data. Customer data can be related to the event or trigger that initiates the evaluation module 2700, i.e., the customer data that is utilized for the executing can be based on the trigger. The customer data can be any data located in one or more places. In the present example of utilizing the framework for posture control, the customer data can include posture control data. After the query is executed, the evaluation module 2700 processes and persists the results in a form that can be provided to customers. That is, the results can be presented to customers via any of the forms and GUIs described herein.

In an exemplary use case, the process begins with a policy definition. For example, the policy definition can be given in the open-source Logica language. It will be appreciated that the policy definition can be given in any language, and the example use of Logica is a non-limiting example. A policy can include metadata which includes an ID if the policy, a severity of the policy which defines the severity of threats that it identifies, and the policy title. Also included in the policy is its implementation.

Utilizing the policy, it can then be compiled for different execution environments. For example, the systems can compile policy queries for various data storage services (e.g. Snowflake, SQLite, etc.) in a universal query language. In various embodiments, a single policy can be compiled into different versions of SQL for different use cases. For example, in the cloud, one database could be used, but another database could be used on user devices. In this example, the systems can compile the policy for any database. After the policy is compiled into the query, the query can be run. After query execution, the resulting data is combined with policy information (e.g. ID, Title, etc.) to produce individual findings. These findings can then be used to provide policy evaluation results to the users or other systems.

The present systems and methods provide a policy framework that is completely abstract from particular data, particular security scenarios, events, and particular triggers. That is, the present systems and methods provide a universal applicable solution for defining scenarios and applying them over data to collect results. The framework in not tied to any particular execution environment, implementation language, data or data structures, and can run in the cloud or on user devices. Further, not only is the framework not tied to a particular data source, but it is also adapted to combine data sources into one policy. Because of this, systems can target different data sources at different times or target multiple data source at the same time. Because of this, the customer providing the data does not have to adjust their data sources to operate with the framework. This also provides flexibility for customers to migrate from one data source to another without any changes to the security infrastructure or the policy catalog.

The present solution requires much less technical knowledge from whoever designs the policies and from customers for defining policies that they want for whatever security scenarios they're interested in. For example, customers can create their own policies through a visual interface, such as the GUI described herein. it will be appreciated that although the present examples reference utilizing the framework for posture control purposes, the present framework can be utilized in any scenario or security system which requires the enforcement of policy on customer data.

Security Policy Framework Process

Figure 30:
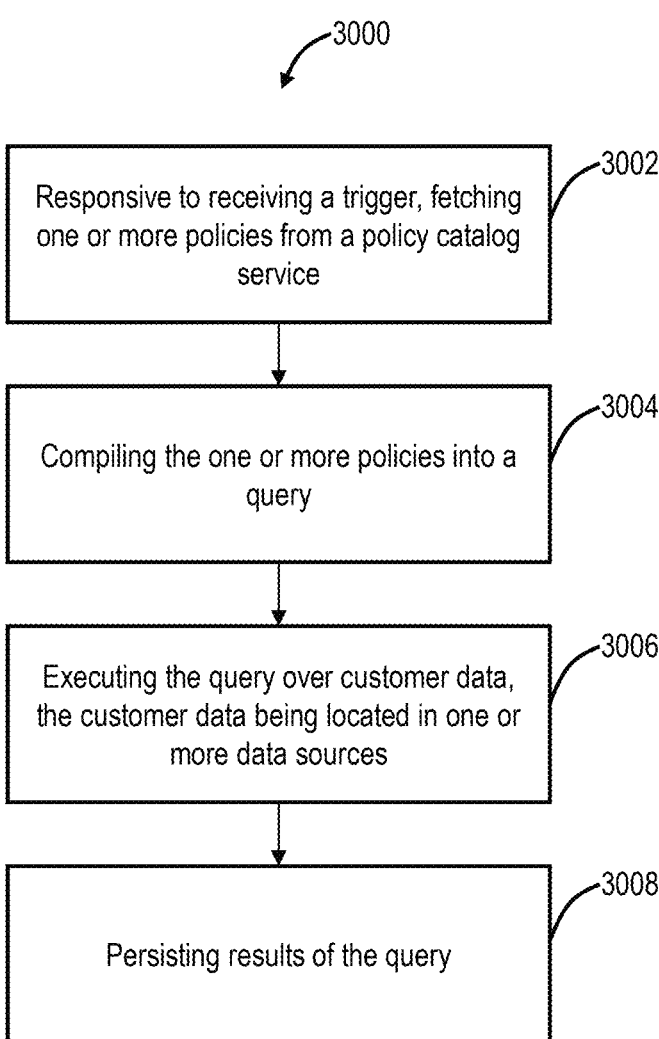
FIG. 30 is a flow chart of a security policy framework process.

FIG. 30 is a process 3000 for network analysis and threat intelligence correlation. The process 3000 includes steps of responsive to receiving a trigger, fetching one or more policies from a policy catalog service (step 3002); compiling the one or more policies into a query (step 3004); executing the query over customer data, the customer data being located in one or more data sources (step 3006); and persisting results of the query (step 3008).

The process 3000 can further include displaying the results to the customer via a Graphical User Interface (GUI). The results can include one or more alerts associated with the customer's cloud environment. The trigger can be received based on any of a schedule or receiving some data about a customer's infrastructure. The query can be executed over customer data located in a plurality of data sources. The one or more policies can be compiled into a plurality of different query languages. The one or more policies can be associated with posture control of the customer's cloud environment, wherein the customer data includes posture control data. The posture control data can include any of assets, identities, network flow logs, activities, and code repositories in the customer's cloud environment. The results can include alerts associated with a combination of a misconfiguration and an activity as a risk in the customer's cloud environment. The cloud environment can be any of a run-time cloud environment and a build-time cloud environment.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:

responsive to receiving a trigger, fetching one or more policies from a policy catalog service;

compiling the one or more policies into a query by, for each of the one or more policies, utilizing a policy compiler to parse the policy definition, map policy conditions to corresponding database fields, and translate the mapped conditions into a Structured Query Language (SQL) statement in a dialect compatible with a query engine, wherein the policy compiler includes pluggable compilation dialects to generate SQL for different execution environments, wherein each of the one or more policies are compiled into an associated SQL query for execution;

executing the associated SQL query via the query engine by connecting to one or more heterogeneous customer data sources, joining or aggregating data retrieved from the data sources in accordance with the SQL query, and applying the policy conditions to identify matching records, the query engine being configured to operate across the heterogeneous data sources with out requiring a uniform schema; and persisting results of the query.

2. The method of claim 1, wherein the steps further comprise displaying the results to the customer via a Graphical User Interface (GUI).

3. The method of claim 1, wherein the results comprise one or more alerts associated with the customer's cloud environment.

4. The method of claim 1, wherein the trigger is received based on any of a schedule or receiving some data about a customer's infrastructure.

5. The method of claim 1, wherein the query is executed over customer data located in a plurality of different types of data sources having different schemas.

6. The method of claim 1, wherein the one or more policies are associated with posture control of the customer's cloud environment, and wherein the customer data comprises posture control data.

7. The method of claim 6, wherein the posture control data comprises any of assets, identities, network flow logs, activities, and code repositories in the customer's cloud environment.

8. The method of claim 6, wherein the cloud environment is any of a run-time cloud environment and a build-time cloud environment.

9. A non-transitory computer-readable medium comprising instructions that, when executed, cause one or more processors to perform steps of:

responsive to receiving a trigger, fetching one or more policies from a policy catalog service;

compiling the one or more policies into a query by, for each of the one or more policies, utilizing a policy compiler to parse the policy definition, map policy conditions to corresponding database fields, and translate the mapped conditions into a Structured Query Language (SQL) statement in a dialect compatible with a query engine, wherein the policy compiler includes pluggable compilation dialects to generate SQL for different execution environments, wherein each of the one or more policies are compiled into an associated SQL query for execution;

executing the associated SQL query via the query engine by connecting to one or more heterogeneous customer data sources, joining or aggregating data retrieved from the data sources in accordance with the SQL query, and applying the policy conditions to identify matching records e query engine being configured to cross the heterogeneous data sources without requiring a uniform schema; and persisting results of the query.

10. The non-transitory computer-readable medium of claim 9, wherein the steps further comprise displaying the results to the customer via a Graphical User Interface (GUI).

11. The non-transitory computer-readable medium of claim 9, wherein the results comprise one or more alerts associated with the customer's cloud environment.

12. The non-transitory computer-readable medium of claim 9, wherein the trigger is received based on any of a schedule or receiving some data about a customer's infrastructure.

13. The non-transitory computer-readable medium of claim 9, wherein the query is executed over customer data located in a plurality of different types of data sources having different schemas.

14. The non-transitory computer-readable medium of claim 9, wherein the one or more policies are associated with posture control of the customer's cloud environment, and wherein the customer data comprises posture control data.

15. The non-transitory computer-readable medium of claim 14, wherein the posture control data comprises any of assets, identities, network flow logs, activities, and code repositories in the customer's cloud environment.

16. The non-transitory computer-readable medium of claim 14, wherein the cloud environment is any of a run-time cloud environment and a build-time cloud environment.

* * * * *